(12) United States Patent
Serikawa et al.

(10) Patent No.: US 7,697,033 B2
(45) Date of Patent: Apr. 13, 2010

(54) IMAGING APPARATUS HAVING IMAGE BLUR SUPPRESSION FUNCTION

(75) Inventors: Yoshio Serikawa, Kasukabe (JP); Shigeru Irisawa, Chigasaki (JP)

(73) Assignee: Ricoh Company, Ltd., Tokyo (JP)

( * ) Notice: Subject to any disclaimer, the term of this patent is extended or adjusted under 35 U.S.C. 154(b) by 773 days.

(21) Appl. No.: 11/543,036

(22) Filed: Oct. 5, 2006

(65) Prior Publication Data

US 2007/0091181 A1    Apr. 26, 2007

(30) Foreign Application Priority Data

Oct. 6, 2005    (JP)    ............... 2005-293992
Oct. 4, 2006    (JP)    ............... 2006-272451

(51) Int. Cl.
*H04N 5/228*    (2006.01)

(52) U.S. Cl. ............... 348/208.3; 348/208.4; 348/208.5

(58) Field of Classification Search .... 348/208.3–208.5
See application file for complete search history.

(56) References Cited

U.S. PATENT DOCUMENTS

| | | | |
|---|---|---|---|
| 4,653,885 A | 3/1987 | Araki et al. | |
| 4,701,041 A | 10/1987 | Serikawa | |
| 4,720,720 A | 1/1988 | Araki et al. | |
| 4,897,684 A | 1/1990 | Serikawa | |
| 4,985,725 A | 1/1991 | Serikawa | |
| 5,148,212 A | 9/1992 | Serikawa | |
| 5,192,964 A | 3/1993 | Shinohara et al. | |
| 5,309,190 A | 5/1994 | Shinohara et al. | |
| 6,778,768 B2 * | 8/2004 | Ohkawara et al. | ............. 396/55 |
| 6,933,968 B2 * | 8/2005 | Yamazaki | ............ 348/208.12 |
| 7,292,270 B2 * | 11/2007 | Higurashi et al. | ........ 348/208.3 |
| 7,379,092 B2 * | 5/2008 | Seo | ......... 348/208.4 |
| 7,432,953 B2 * | 10/2008 | Washisu | ................ 348/208.5 |
| 7,436,435 B2 * | 10/2008 | Wada | ..................... 348/208.4 |
| 7,499,635 B2 * | 3/2009 | Tanaka et al. | ................. 396/55 |
| 2002/0126210 A1 | 9/2002 | Shinohara et al. | |
| 2004/0247307 A1 | 12/2004 | Serikawapto | |
| 2006/0055787 A1 * | 3/2006 | Hirota et al. | ............ 348/208.5 |

FOREIGN PATENT DOCUMENTS

| | | |
|---|---|---|
| JP | 2004-274242 A | 9/2004 |
| JP | 2004-354878 A | 12/2004 |

\* cited by examiner

*Primary Examiner*—Tuan Ho
*Assistant Examiner*—Kent Wang
(74) *Attorney, Agent, or Firm*—Dickstein Shapiro LLP

(57) ABSTRACT

An imaging apparatus, including an image pick up device capable of moving in a transverse direction to a photographing optical axis, a drive circuit configured to prevent an image on the image pick up device from blurring or reduce the image blur by moving the image pick up device based on an amount of the image blur, a position detection device configured to detect a position of the image pick up device, a storing device configured to store reference positional information showing that the image pick up device is in the reference position based on an output of the position detection device, the position of the image pick up device being detected based on the reference positional information stored in the storing device when the image pick up device is driven by the drive circuit.

11 Claims, 33 Drawing Sheets

GENERAL OPERATION OF DIGITAL CAMERA

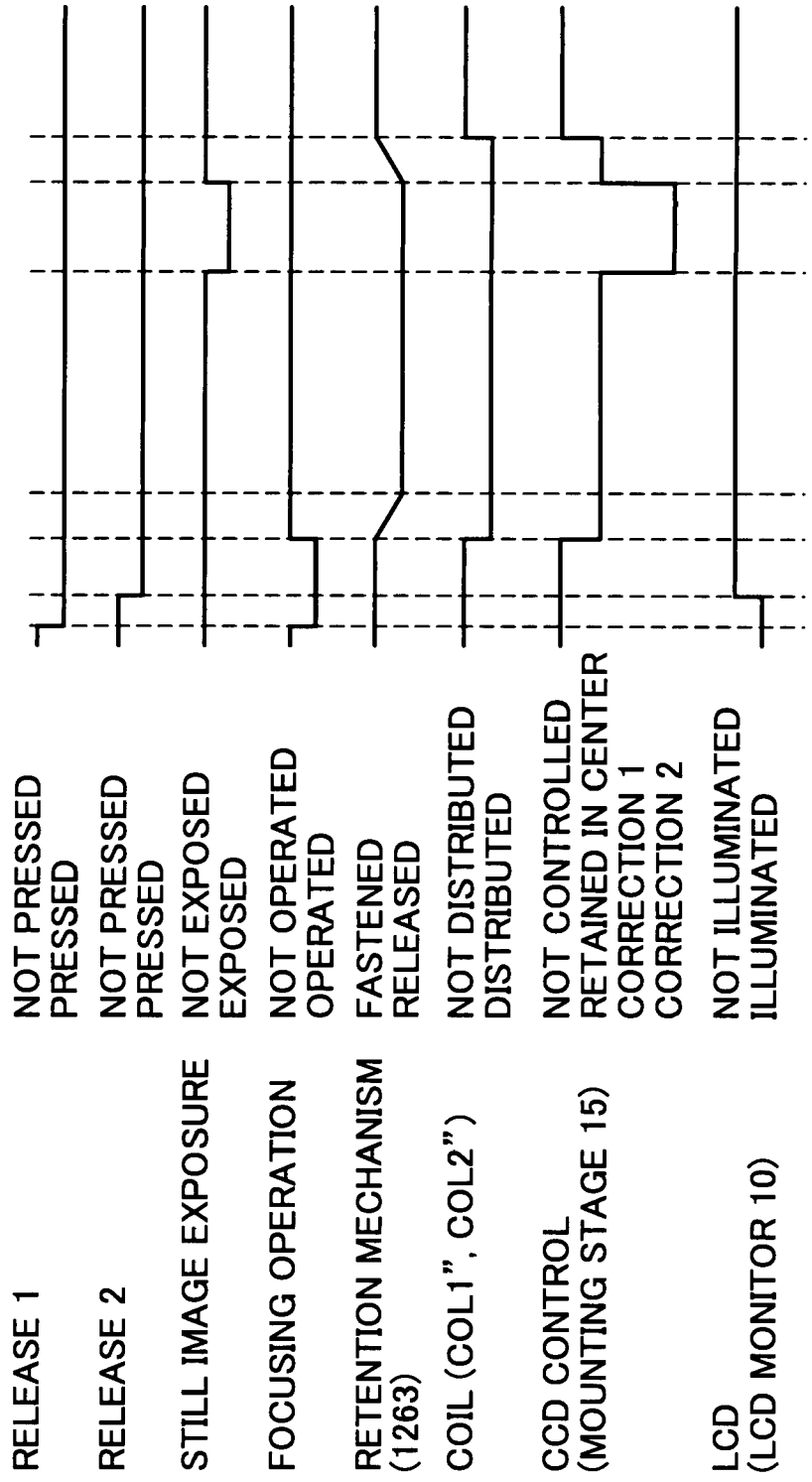

IMAGING APPARATUS HAVING IMAGE BLUR SUPPRESSION FUNCTION

CROSS-REFERENCE TO THE RELATED APPLICATIONS

This application is based on and claims the priority benefit of each of Japanese Patent Application No. 2005-293992, filed on Oct. 6, 2005 and Japanese Patent Application No. 2006-272451, filed on Oct. 4, 2006, the contents of which are incorporated herein by reference.

BACKGROUND OF THE INVENTION

1. Field of the Invention

The present invention relates to an imaging apparatus having a function for suppressing an image blur, especially, to a control circuit thereof.

2. Description of Related Art

For an imaging apparatus having a function for suppressing an image blur, for example, a digital camera (camera), there has been known a structure which mounts a CCD as an image pick-up device onto a mounting stage so as to move the CCD relative to a photographing lens. With the above camera, vibrations in the yaw direction and the pitch direction are detected by using a camera shake detection sensor, the CCD is moved in the X-Y direction within the plane perpendicular to the optical axis of the photographing lens as the Z-axis direction by changing the power distribution voltage to a coil based on the detection output, the position of X-Y direction of the CCD is detected by a position detection device or position detection element, and the CCD is moved so as to match with the position of image (reference to JP2004-274242).

By the way, when a hall element is used as the position detection element, there exists an assembling error factor regarding mechanical positional relationship between a magnet and the hall element at the time of assembling a camera. Moreover, there exists an assembling error factor between the installation position of hall element relative to the mounting stage and the installation position of coil. Furthermore, there exists an error factor related to the hall element that its specific output characteristic varies.

Accordingly, when performing control which detects a position of CCD at present by the output of hall element with using the optical axis of the photographing lens as a reference position or original position, the output of hall element corresponding to the reference position or original position relative to detection output of sensor (gyro sensor, etc.) varies for each of cameras. Thus, accurate control for suppressing an image blur can not be performed.

SUMMARY OF THE INVENTION

The present invention has been, therefore, made in view of the above circumstance, and an object of the present invention is to provide an imaging apparatus having a function for suppressing an image blur to be capable of solving an error factor which is variations in detection output values resulted from a specific characteristic of a position detection device or position detection element, an assembling error factor regarding mechanical positional relationship between a magnet and a hall element, an assembling error factor related to an installation position of a hall element and an installation position of a coil with respect to a mounting stage, and an error factor which is variations in a specific output characteristic of the hall element itself.

In order to achieve the above object, an imaging apparatus according to one embodiment of the present invention includes an image pick up device capable of moving in a transverse direction to a photographing optical axis, a drive circuit configured to prevent an image on the image pick up device from blurring or reduce the image blur by moving the image pick up device based on an amount of the image blur, a position detection device configured to detect a position of the image pick up device, a storing device configured to store reference positional information showing that the image pick up device is in the reference position based on an output of the position detection device.

The position of the image pick up device is detected based on the reference positional information stored in the storing device when the image pick up device is driven by the drive circuit.

According to the present invention, it is possible to solve an error factor which is variations in detection output values resulted from a specific characteristic of a position detection element, an assembling error factor regarding mechanical positional relationship between a magnet and a hall element, an assembling error factor related to an installation position of a hall element and an installation position of a coil with respect to a mounting stage, and an error factor which is variations in a specific output characteristic of the hall element itself.

BRIEF DESCRIPTION OF THE DRAWINGS

FIG. 25 is a block circuit diagram illustrating a modification example of a feedback circuit present in FIG. 22, in which

FIG. 29 is a timing chart presenting one example of the camera correction process in case of the full-pressing at one shot of the imaging apparatus according to the present invention.

DETAILED DESCRIPTION OF THE PREFERRED EMBODIMENTS

Hereinafter, a digital camera as one example of an imaging apparatus having a function for suppressing an image blur and a function which solves a variation in a position detection element according to the present invention will be exemplified with reference to the accompanying drawings.

EMBODIMENT (General Structure of Digital Camera)

Figure 1:
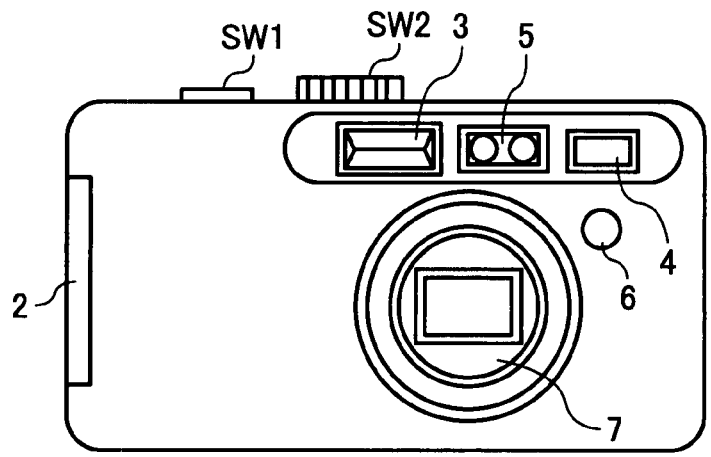
FIG. 1 is a front view of a digital camera according to the present invention.
Figure 2:
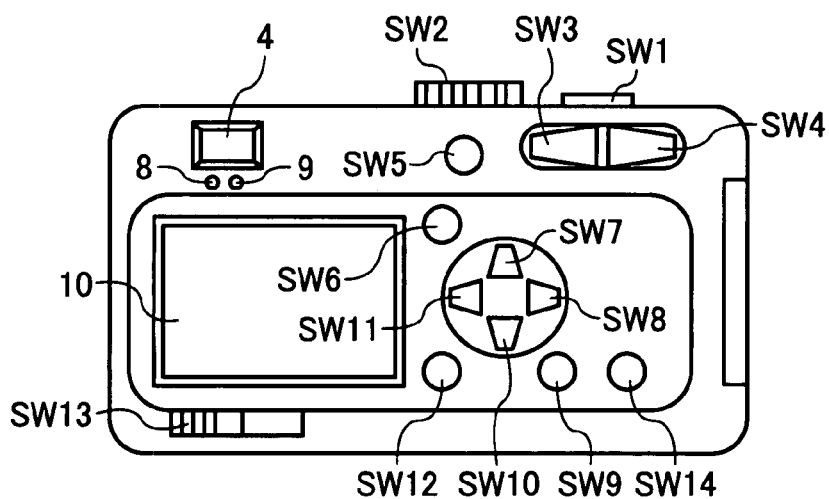
FIG. 2 is a back view of the digital camera according to the present invention.
Figure 3:
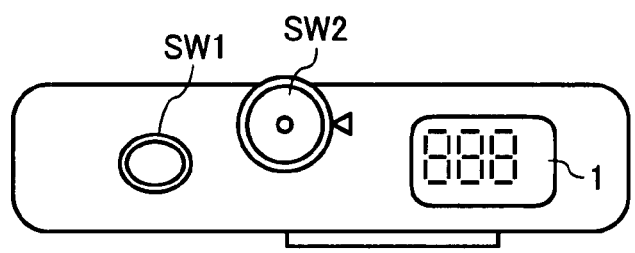
FIG. 3 is a top view of the digital camera according to the present invention.
Figure 4A:
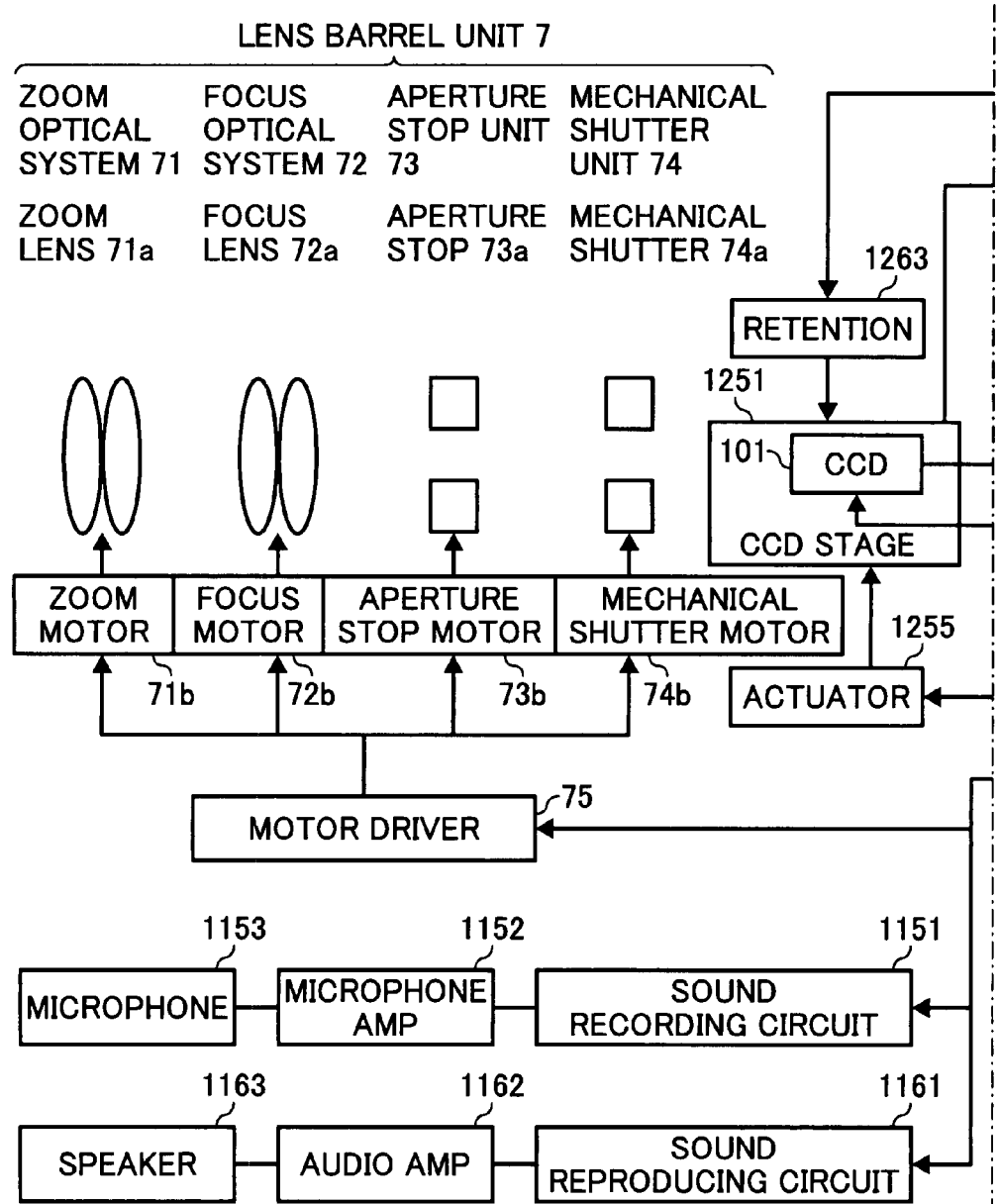
FIG. 4 is block circuit diagram illustrating a schematic system structure of an interior of the digital camera according to the present invention.
Figure 4B:
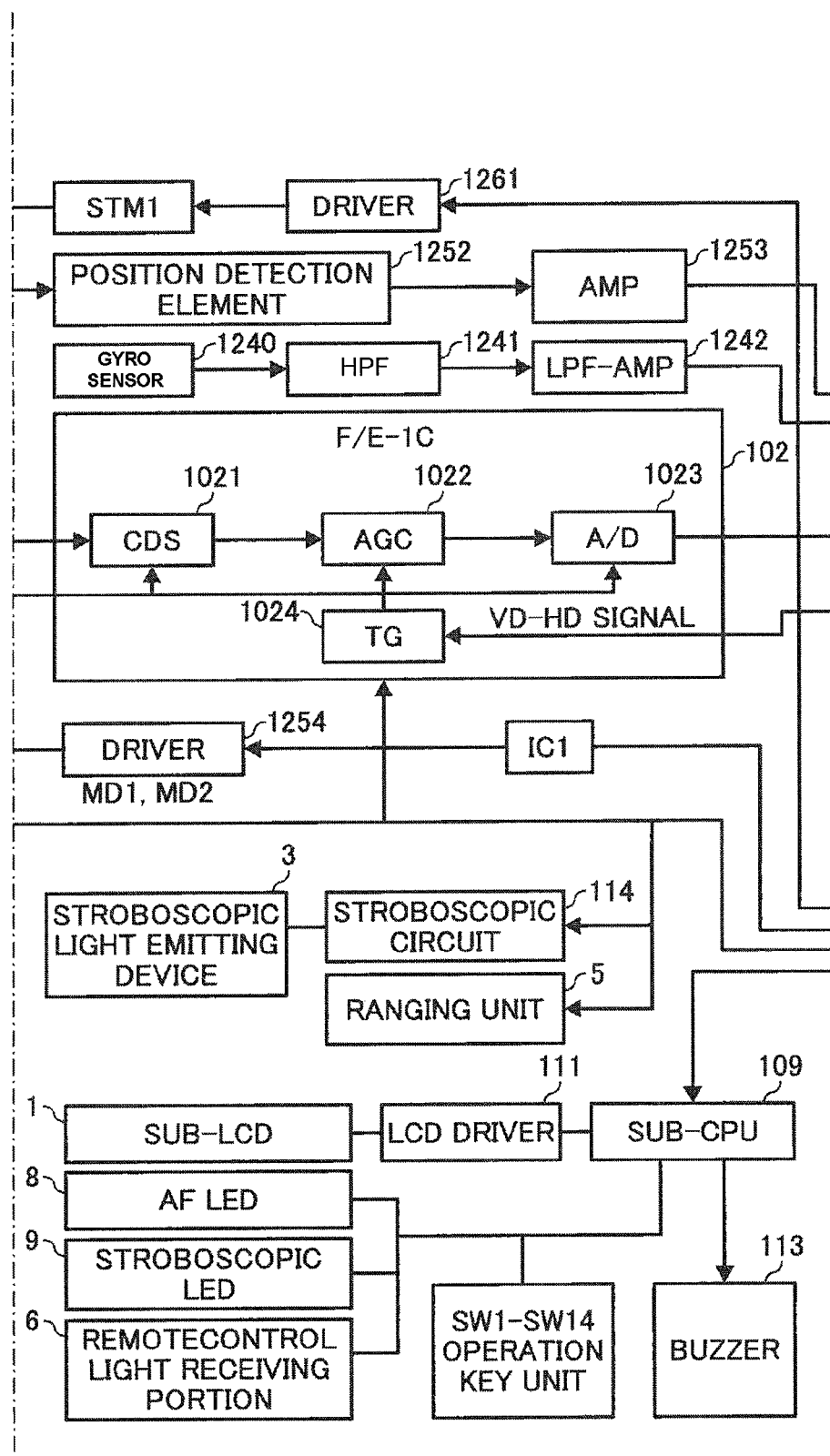
Figure 4C:
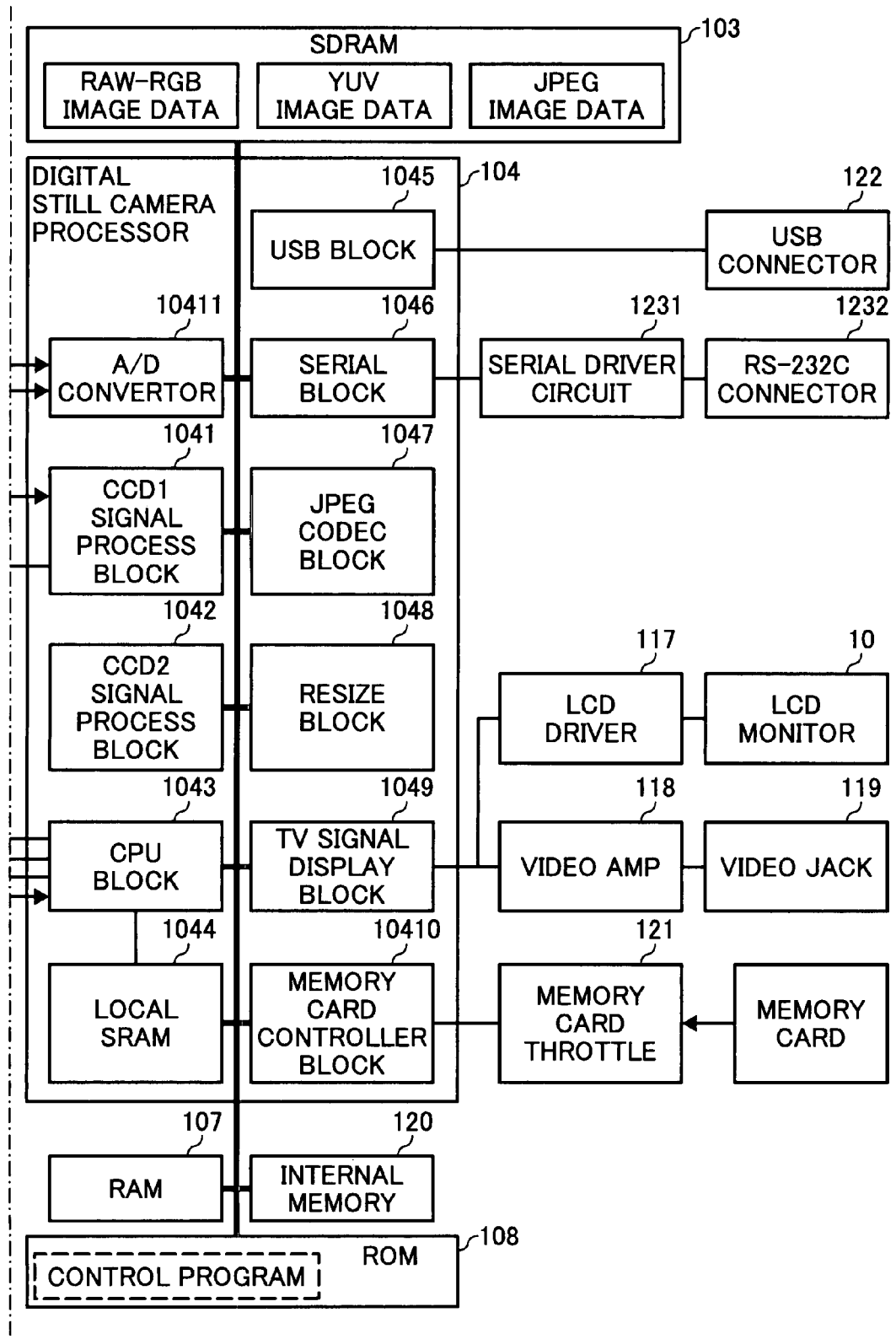

FIG. 1 is a front view illustrating a digital still camera (hereinafter, referred to as a camera) as an imaging apparatus according to the present invention, FIG. 2 is a back view thereof, FIG. 3 is a top view thereof, and FIG. 4 is a block circuit diagram illustrating a schematic system structure of the digital camera interior.

Referring to FIG. 1, a camera body has a top plane (the top plane when the subject side is the front plane) provided with a release switch (release shutter) SW1, a mode dial SW2, and a sub liquid crystal display (or sub LCD) 1 presented in FIG. 3.

The camera body has a front plane (subject side) provided with a lens barrel unit 7 including a photographing lens, an optical finder 4, a stroboscopic light emitting section 3, a ranging unit 5, and a remote control light receiving section 6.

The camera has a back plane (photographer's side), as illustrated in FIG. 2, provided with a power switch SW13, an LCD monitor 10, an AF LED 8 a stroboscopic LED 9, the optical finder 4, a wide angle direction zoom switch SW3, a telephoto direction zoom switch SW4, a self timer setting/releasing switch SW5, a menu switch SW6, an upward movement/stroboscopic setting switch SW7, a right movement switch SW8, a display switch SW9, a downward movement/micro-switch SW10, a left movement/image confirmation switch SW11, an OK switch SW12, and a switch for suppressing an image blur SW14. The camera body has a side plane provided with a lid 2 of memory card/battery loading room.

Next, the system structure of camera interior will be explained.

Referring to FIG. 4, reference number 104 denotes a digital still camera processor (hereinafter, referred to as a processor).

The processor 104 comprises an A/D converter 10411, a CCD1 signal processing block 1041, a CCD2 signal processing block 1042, a CPU block 1043, a local SRAM 1044, an USB block 1045, a serial block 1046, a JPEG/CODEC block (JEPG compression/decompression block) 1047, a RESIZE block (block which expands and reduces size of image data by an interpolating process) 1048, a TV signal display block (block which converts image data to a video signal for displaying on a display device such as a liquid crystal monitor or TV) 1049, and a memory card controller block (block which conducts control of a memory card for recording photographing image data) 10410. Each of the blocks is connected each other via a bus line.

Disposed in the outside of the processor 104 is a SDRAM 103 for storing RAW-RGB image data (image data that white balance setting and γ setting are performed), YUV image data (image data that luminance data and color difference data conversion are performed), and JPEG image data (image data that JPEG compression is performed), which is connected to the processor 104 via a memory controller (not shown) and a bus line.

In addition, disposed in the outside of the processor 104 is a RAM 107, an internal memory 120 (a memory which stores photographing image data when a memory card is not installed in a memory card throttle), and a ROM 108 having a control program, parameter, etc., stored therein, which are connected to the processor 104 via a bus line.

The control program stored in the ROM 108 is loaded in the main memory (not shown) of the processor 104 when turning on the power switch SW13 of camera. The processor 104 controls the operation of each section according to the control program and also temporary stores the control data, parameters, etc., in the RAM 107 or the like.

The lens barrel unit 7 comprises a lens barrel including a zoom optical system 71 having a zoom lens 71a as a lens system, a focus optical system 72 having a focus lens 72a as a lens system, an aperture stop unit 73 having an aperture stop 73a, and a mechanical shutter unit 74 having a mechanical shutter 74a.

The zoom optical system 71, focus optical system 72, aperture stop unit 73, and mechanical shutter unit 74 are driven by a zoom motor 71b, a focus motor 72b, an aperture stop motor 73b, and a mechanical shutter motor 74b, respectively.

Each of these motors is driven by a motor driver 75, and the motor driver 75 is controlled by the CPU block 1043 of the processor 104.

A subject image is imaged onto the CCD 101 by each of the lens systems of lens barrel unit 7, and the CCD 101 converts the subject image into an image signal to output the image signal to an F/E-IC 102. The F/E-IC 102 comprises a CDS 1021 which performs correlated double sampling for eliminating image noise, an AGC 1022 for gain adjustment, and an A/D converter 1023 which conducts analog/digital conversion. More particularly, F/E-IC 102 conducts a predetermined process to the image signal to convert the analog image signal to the digital signal, and output the digital signal to the CCD1 signal processing block 1041 of the processor 104.

These signal control processes are performed via a TG 1024 by a vertical synchronization signal VD and a horizontal synchronization signal HD output from the CCD1 signal processing block 1041 of processor 104. The TG 1024 generates a driving timing signal based on the vertical synchronization signal VD and horizontal synchronization signal HD.

The CPU block 1043 of processor 104 is configured to control voice recording operation by a sound recording circuit 1151. The sound recording circuit 1151 records a signal amplified by a microphone amplifier 1152 of a sound recording signal converted by a microphone 1153 according to a command. The CPU block 1043 controls operation of a sound reproducing circuit 1161. The sound reproducing circuit 1161 reproduces a sound signal appropriately stored in a memory by a command and outputs the sound signal to an audio amplifier 1162 so as to output the sound from a speaker 1163.

The CPU block 1043 controls a stroboscopic circuit 114 so as to flash illumination light from the stroboscopic light emitting device 3. The CPU block 1043 also controls the ranging unit 5.

The CPU block 1043 is connected to a sub CPU 109 of the processor 104. The sub CPU 109 controls the display by the sub LCD 1 via an LCD driver 111. The sub CPU 109 is also connected to the AF LED 8, stroboscopic LED 9, remote control light receiving portion 6, operation key unit having the operation switches SW1-SW14 and a buzzer 113.

The USB block 1045 is connected to a USB connector 122. The serial block 1046 is connected to an RS-232C connector 1232 via a serial driver circuit 1231. The TV signal display block 1049 is connected to the LCD monitor 10 through an LCD driver 117, and also connected to a video jack (which connects the camera to an external display device such as TV) 119 via a video amplifier (which converts a video signal output from the TV signal display block 1049 into 75Ω impedance) 118. The memory card controller block 10410 is connected to the memory card with the card contact point of a memory card throttle 121.

The LCD driver 117 drives the LCD monitor 10 and also converts the video signal output from the TV signal display block 1049 into a signal for displaying onto the LCD monitor 10. The LCD monitor 10 is used for monitoring a subject condition before photographing, confirming a photographed image and displaying image data recorded in a memory card or an internal memory.

The digital camera has the body provided with a fixation casing (described later) comprising a part of the lens barrel unit 7. The fixation casing is provided with a CCD stage 1251 capable of moving in the X-Y direction. The CCD 101 is installed in the CCD stage 1251 comprising a part of mechanism for suppressing an image blur. The details of mechanical structure of the CCD stage 1251 will be described later.

The CCD stage 1251 is driven by an actuator 1255, and the driving of actuator 1255 is controlled by a driver 1264. The driver 1254 comprises a coil drive MD1 and a coil drive MD2. The driver 1254 is connected to an analog/digital converter IC1 which is connected to the CPU block 1043. The control data is input to the analog/digital converter IC1 from the CPU block 1043.

The fixation casing is provided with a reference position forced retention mechanism 1263 which retains the CCD stage 1251 to the central position when the suppression switch SW14 is powered off or the power switch SW13 is powered off. The reference position forced retention mechanism 1263 is controlled by a stepping motor STM1 as an actuator which is driven by a driver 1261. The control data is input to the driver 1261 from the ROM 108.

The CCD stage 1251 is provided with a position detection element 1252. The detection output of position detection element 1252 is input to an operational amplifier 1253 to be amplified, and the amplified detection output is input to the A/D converter 10411. The camera body is provided with a gyro sensor 1240, which can detect the rotation of camera in the pitch direction and yaw direction. The detection output of the gyro sensor 1240 is input to the A/D converter 10411 via an amplifier 1242 which is also used as a low pass filter after the detection output passes through a high pass filter 1241.

Next, a general operation of a camera according to the present invention will be schematically explained.

If the mode dial SW2 is set to a photographing mode, and the power switch SW13 is pressed, the camera is activated with the photographing mode. Also, if the mode dial SW2 is set to a reproducing mode, and the power switch SW13 is pressed, the camera is activated with the reproducing mode. The processor 104 determines whether the switch condition of the mode dial SW2 is the photographing mode or the reproducing mode (S1, FIG. 5).

The processor 104 controls the motor driver 75 to move the lens barrel of the lens barrel unit 7 to a photographable position. Moreover, the processor 104 powers on each of the circuits of the CCD 101, F/E-IC 102, LCD monitor 10, and the like to start the operation. If each of the circuits is powered on, the operation of photographing mode is initiated.

In the photographing mode, the light entered into the image pick-up device (CCD 101) through each of the lens systems is photo-electrically converted to be sent to the CDS circuit 1021 and the A/D converter 1023 as analogue signals of R, G, B. The A/D converter 1023 converts the analogue signals into the digital signal. The digital signals are converted into the YUV image data by a YUV converter in the digital signal processing IC (SDRAM 103), and written into a flame memory by a memory controller (not shown).

The YUB signal is read by the memory controller, and is sent to a TV (not shown) or the LCD monitor 10 via the TV signal display block 1049; thereby, the photographing image is displayed. This process is performed at intervals of ⅓₀ seconds; thus, the display of photographing image in the photographing mode will be renewed at every ⅓₀ seconds. Namely, a monitoring process is carried out (S2, FIG. 5). Next, the processor 104 determines whether or not the setting of mode dial SW2 has been changed (S3, FIG. 5). If the setting of mode dial SW2 remains in the photographing mode, the photographing process is carried out according to the operation of release switch SW1 (S4, FIG. 5).

Figure 5:
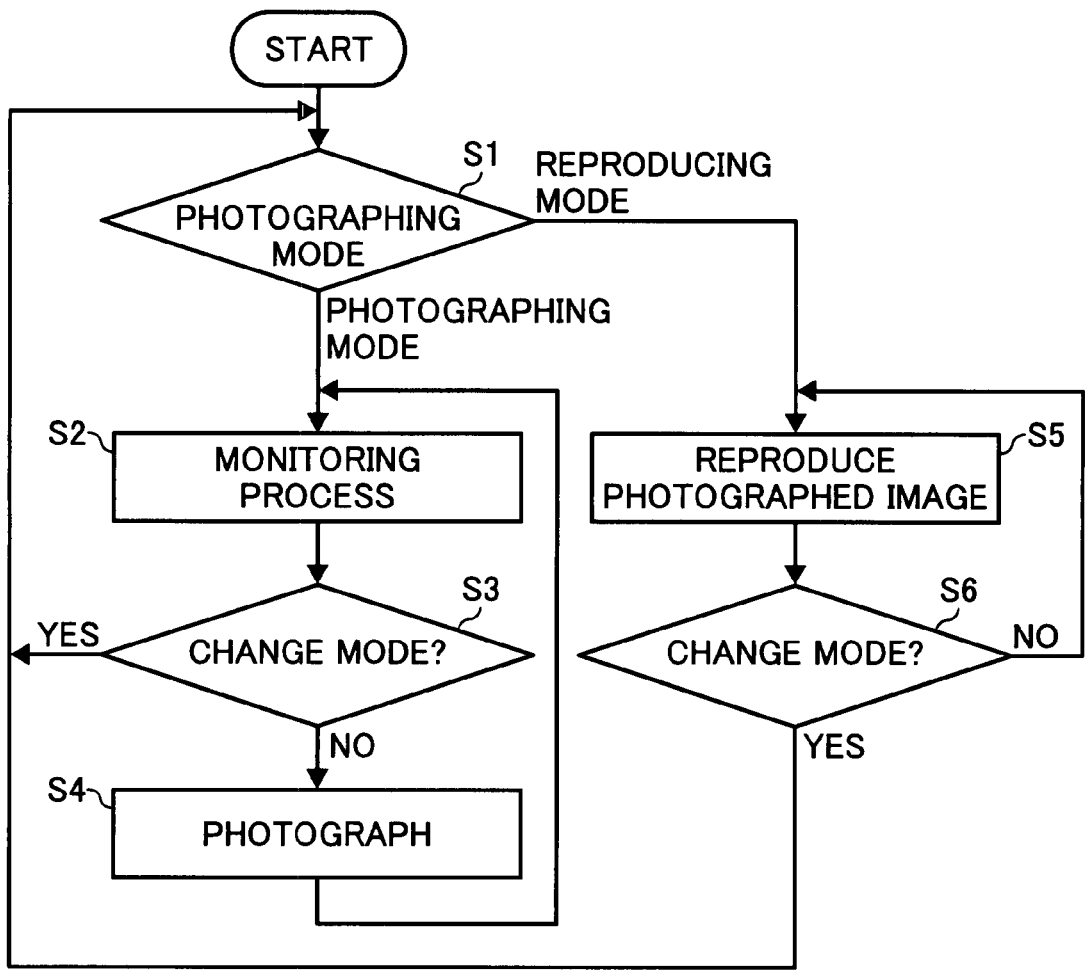
FIG. 5 is a flow chart explaining general operation of the digital camera according to the present invention.

In the reproducing mode, the processor 104 displays the photographed image onto the LCD monitor 10 (S5, FIG. 5). Next, the processor 104 determines whether or not the setting of mode dial SW2 has been changed (S6, FIG. 5). If the setting of mode dial SW2 has been changed, the flow moves to S1. If the setting of mode dial SW2 has been unchanged, the process of S5 is repeated.

(Principle of Image Blur Suppression)

Figure 6A:
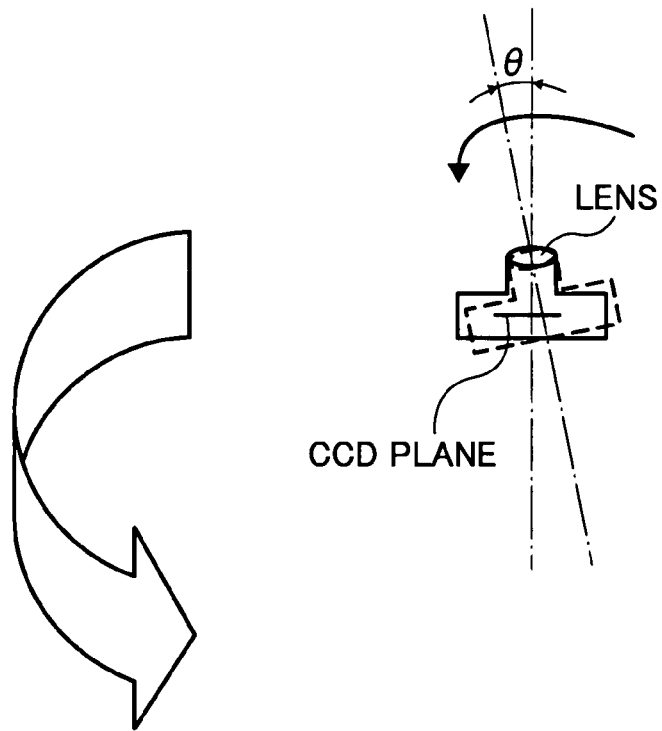
FIG. 6A is a view explaining a principle for suppressing an image blur according to the present invention, presenting the inclination of digital camera.
Figure 6B:
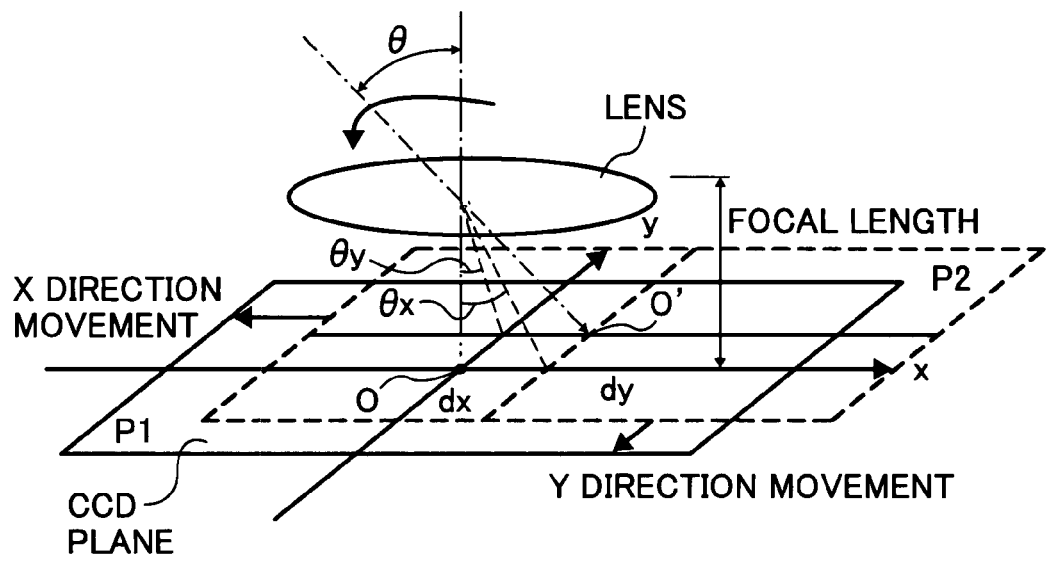
FIG. 6B is a partly enlarged view presenting relationship between a photographing lens and an imaging surface of a CCD of the digital camera.

FIGS. 6A, 6B illustrate views for explaining a principle of image blur suppression. FIG. 6A presents the state of digital camera as illustrated by the dotted line inclined with respect to the state of digital camera free from the camera shake as illustrated by the solid line. FIG. 6B is a partly enlarged view illustrating relationship between the photographing lens of camera body and the imaging plane of CCD 101.

If the camera is not moved by the camera shake, and the imaging plane of CCD 101 is in a position P1, i.e., in the central position, the image of subject is projected on the reference position or the original position O of the position P1 of the imaging plane illustrated by the solid line in FIG. 6B. Here, if the camera is inclined in the θ direction (θx, θy) by the camera shake, the imaging plane shifts to the position P2 of imaging plane illustrated by the dotted line in FIG. 6B and the image of subject shifts to O'. In this case, the imaging plane is moved in parallel at dx in the X-direction and dy in the Y-direction, such that the position P2 of imaging plane illustrated by the dotted line overlaps with the position P1 of the imaging plane. The image of subject, thereby, returns to the original position of original position O.

(Mechanical Structure of Suppression Function)

Figure 7:
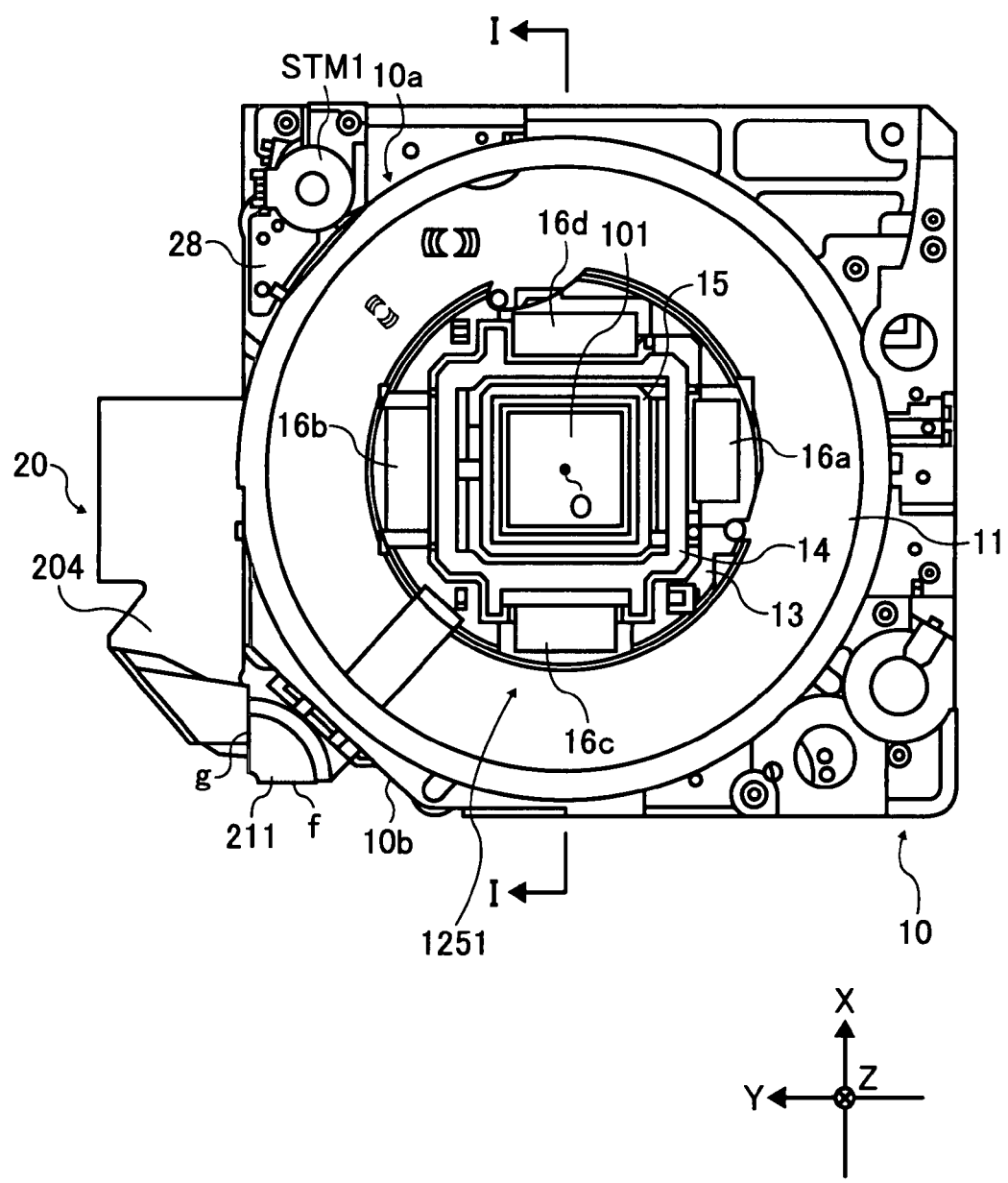
FIG. 7 is a front view illustrating a fixation casing of the lens barrel of the digital camera according to the present invention.
Figure 8:
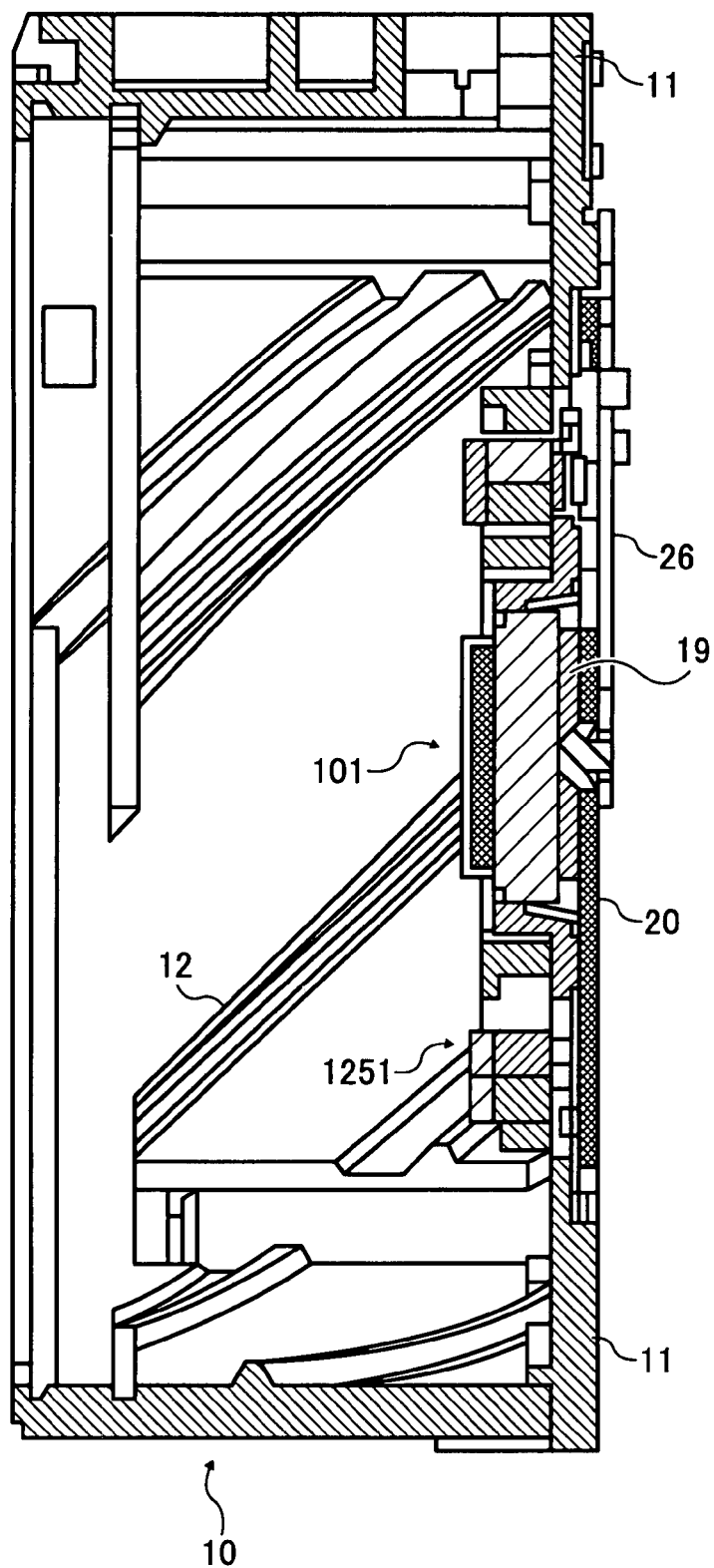
FIG. 8 is a longitudinal section view of the fixation casing presented in FIG. 7.

FIG. 7 depicts the front view of fixation casing, FIG. 8 depicts the longitudinal sectional view of fixation casing, and FIG. 9 depicts the back view of fixation casing. Referring to FIGS. 7-9, reference number 10 denotes the fixation casing. The fixation casing 10 preferably comprises a box-like shape, and the inside thereof is used as a storage space for receiving the lens barrel. The fixation casing 10 has a back plane provided with a plate-like base member 11 preferably comprising a substantially rectangular shape in its entirety. The fixation casing 10 has an inner circumference wall formed with a helicoid for extending and collapsing the lens barrel. The fixation casing 10 includes at least two notched corner portions. One of the corner portions 10a is used as an installation portion of an after mentioned stepping motor STM, and the other corner portion 10b is used as a bending portion of an after mentioned flexible printed board 20.

The CCD stage 1251 is provided in the base member 11. The CCD stage 1251 comprises an X-direction stage 13 preferably having a circular frame shape, a Y-direction stage 14 preferably having a rectangular shape and a mounting stage 15, as separately illustrated in FIG. 10.

The X-direction stage 13 is fastened to the base member 11. The X-direction stage 13 is provided with a pair of guide shafts 13a, 13b extending in the X-direction at intervals in the Y-direction. The X-direction stage 13 is provided with two pairs of permanent magnets 16a-16d, preferably each having a rectangular shape. One pair of permanents magnets 16a, 16b is disposed in parallel at intervals in the Y-direction within the X-Y plane. In this embodiment, the pair of guide shafts 13a, 13b penetrates the pair of permanent magnets 16a, 16b, respectably, but the pair of permanent magnets 16a, 16b and the pair of guide shafts 13a, 13b may be installed in combination. One pair of permanent magnets 16c, 16d is disposed in parallel at intervals in the X-direction within the X-Y plane.

The Y-direction stage 14 is provided with a pair of guide shafts 14a, 14b extending in the Y-direction at intervals in the X-direction. The Y-direction stage 14 is also provided with a pair of supported portions 17a, 17a', which faces each other at intervals in the X-direction, and a pair of supported portions 17b, 17b', which faces each other at intervals in the X-direction. The two pairs of supported portions 17a, 17a', 17b, 17b' are disposed at intervals in the Y-direction. The pair of supported portions 17a, 17a' is movably supported in the guide shaft 13a of the X-direction stage 13, and the pair of supported portion 17b, 17b' is movably supported in the guide shaft 13b of the X-direction stage 13. The Y-direction stage 14 can be, thereby, moved in the X-direction.

The CCD 101 is fastened onto the mounting stage 15. The mounting stage 15 comprises a pair of coil attachment plate portions 15a, 15b overhanging in the X-direction and a pair of coil attachment plate portions 15c, 15d overhanging in the Y-direction. The CCD 101 is roughly fastened to the center of mounting stage 15. The mounting stage 15 is provided with a pair of supported portions (not shown), which faces each other at intervals in the Y-direction, and a pair of supported potion (not shown), which faces each other at intervals in the Y-direction. The two pairs of supported portions are disposed at intervals in the X-direction in the same side as the imaging plane of CCD 101. One pair of supported portions is movably supported in the guide shaft 14a of the Y-direction stage 14, and the other pair of supported portions is movably supported in the guide shaft 14b of the Y-direction stage 14. The mounting stage 15 can be, thereby, moved in the X-Y direction in its entirety.

Attached to the plane opposite to the imaging surface of the CCD 101 is a protection plate 19 preferably having a taper shaped concave portion 19a formed in the central portion thereof. The function of the concave portion 19a will be described later.

The coil attachment plate portions 15a, 15b are provided with flat and scroll-like coil bodies COL1, COL1', respectively, which are serially connected. The coil attachment plate portions 15c, 15d are provided with flat and scroll-like coil bodies COL2, COL2', respectively, which are serially connected.

Each of the coil bodies COL1, COL1' is disposed to face each of the permanent magnets 16c, 16d. Each of the coil bodies COL2, COL2' is also disposed to face each of the permanent magnets 16a, 16b. The pair of coil bodies COL1, COL1' is used to move the CCD 101 in the X-direction (for example, pitch direction) transverse, for example, perpendicular to the photographing optical axis, and a pair of coil bodies COL2, COL2' is used to move the CCD 101 in the Y-direction (for example, yaw direction) transverse, for example, perpendicular to both the photographing optical axis and the X-direction.

Figure 9A:
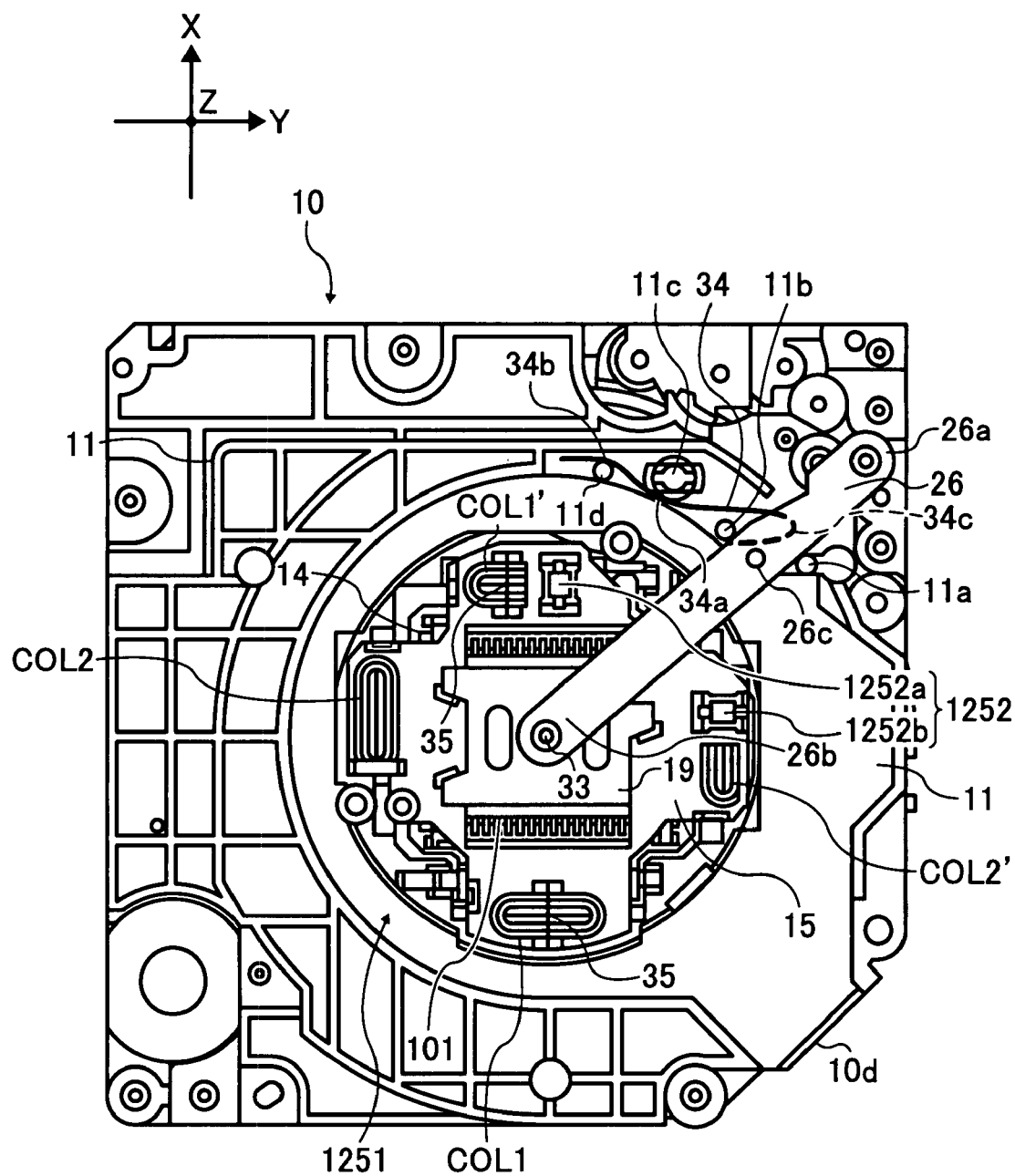
FIG. 9A is a back view of the fixation casing illustrated in FIG. 7, presenting a stage where a flexible printed board is not attached.

Each of the coil bodies COL1, COL1' is provided with an adsorption bar 35 comprising a magnetic material in the direction so as to intersect each of the coil bodies COL1, COL1' in the X-direction, as presented in FIG. 9A.

In this case, a hall element may be used as the position detection element 1252. One of the coil attachment plate portions 15a, 15b, for example, the coil attachment plate portion 15b is provided with a hall element 1252a as the position detection element 1252. Similarly, one of the coil attachment plate portions 150, 15d, for example, the coil attachment plate portion 15d is provided with a hall element 1252b.

Figure 11:
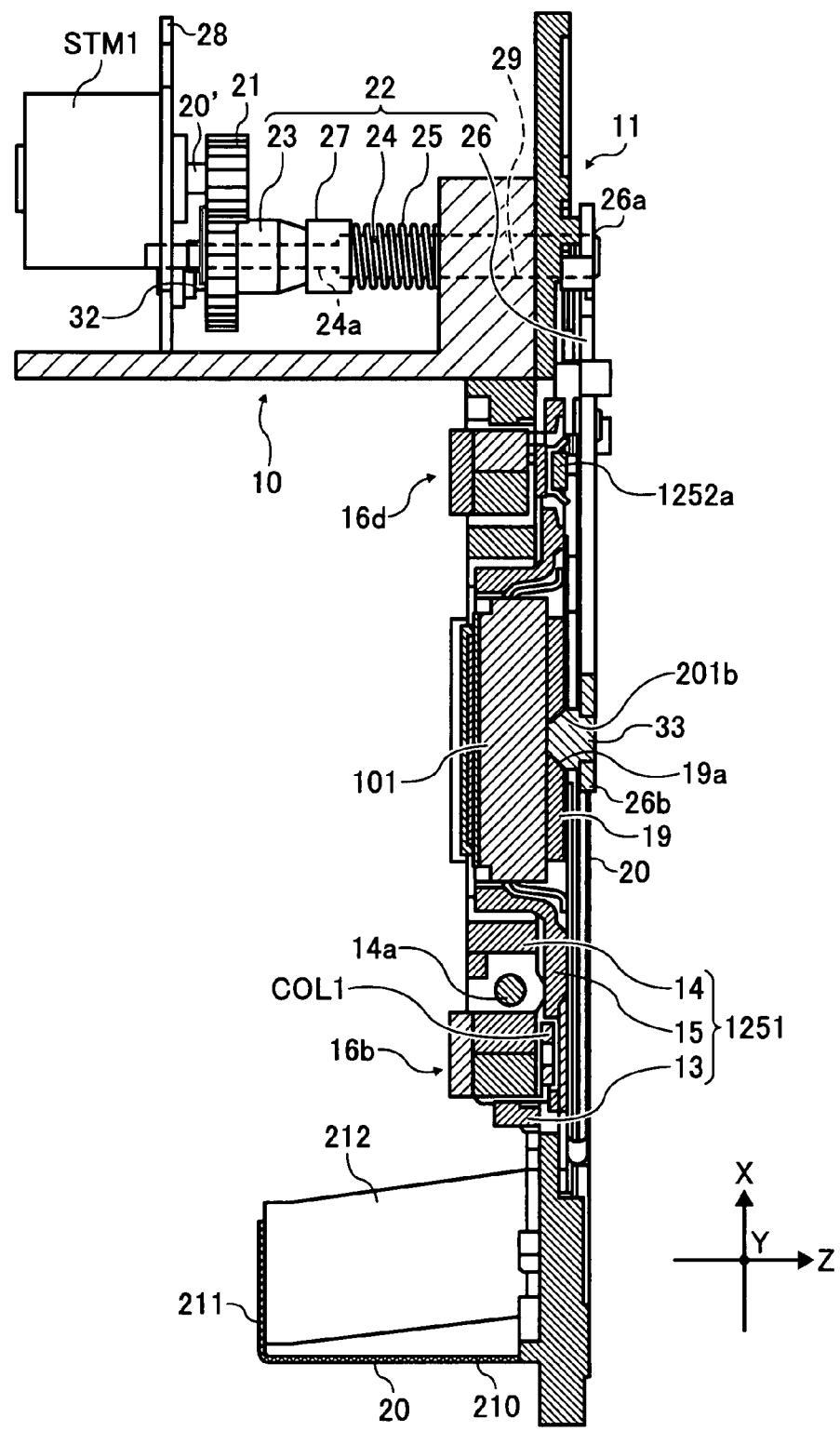
FIG. 11 depicts a partly enlarged sectional view along the II-II line in FIG. 9B.

The CCD 101 is electrically connected to the F/E-IC 102 via flexible printed board 20 (reference to FIG. 11). The hall elements 1252a, 1252b are electrically connected to the operational amplifier 1253 via the flexible printed board 20, and each of the coil bodies COL1, COL1', COL2, COL2' is electrically connected to the coil driver 1254.

As illustrated in the enlarged views of FIGS. 11, 12, the reference position forced retention mechanism 1263 comprises the stepping motor STM1. At first, the mechanical structure of the reference position forced retention mechanism 1263 will be described in details, and the driving and controlling of the stepping motor STM1 will be described later.

As illustrated in FIGS. 7, 11, the stepping motor STM1 is provided in the corner portion boa of the fixation casing 10. The stepping motor STM1 has an output shaft 20' provided with an output gear 21. The corner portion 10a of the fixation casing 10 is provided with a conversion mechanism 22 which converts rotational movements to linear movements.

The conversion mechanism 22 comprises a rotation transferring gear 23, a reciprocating shaft 24, a coil biasing spring 25, a forced retainer plate 26, and a spring supporting member 27. The corner portion 10a of the fixation casing 10 is formed with a pair of supporting portions 28, 29 at intervals in the Z-axis direction. The supporting portion 28 comprises a motor attachment plate. The reciprocating shaft 24 is supported between the supporting portion 29 and the motor attachment plate 28. The rotation transferring gear 23 locates between the pair of supporting portions 28, 29 to be rotatably supported in the reciprocating shaft 24 and engaged with the output gear 21.

The reciprocating shaft 24 has a portion of one end side which penetrates the supporting portion 29 to face the back plane side of the base member 11. The coil biasing spring 25 is provided between the spring supporting portion 27 and the supporting portion 29. The reciprocating shaft 24 is biased toward the supporting portion 28 by the coil biasing spring 25. The reciprocating shaft 24 includes a step portion 24a which engages with the shaft hole at the end plane of the rotation transferring gear 23.

As presented in FIGS. 13A-13E, the rotation transferring gear 23 has one of the end plane portions provided with a cam groove 31, which extends in the circumference direction of the rotation transferring gear 23, and comprises a flat valley floor portion 31a, a flat peak portion 31b, and an inclined surface portion 31c inclining continuously from the flat valley floor portion 31a toward the flat peak portion 31b. A steep cliff 31d is formed between the flat valley floor portion 31a and the flat top portion 31b as a contact wall with which an after mentioned cam pin has contact from the rotation direction.

The cam pin 32 is fastened to the supporting portion 28, and has the leading end which slides in contact with the cam groove 31. The length in the rotation direction of the flat valley floor portion 31a from the steep cliff 31d to an incline start position 31e of the inclined surface portion 31c is equivalent to 2 pulses converted to the rotation control signal of the stepping motor STM1.

The length in the rotational direction of the inclined surface portion 31c from the incline start position 31e of the inclined surface portion to an incline end position 31f leading to the flat peak portion 31b is equivalent to 3 pulses converted to the rotation control signal of the stepping motor STM1.

The length in the rotation direction of the peak flat portion 31b between the incline end position 31f and the steep cliff 31d is equivalent to 3 pulses converted to the rotation control signal of the stepping motor STM1. The stepping motor STM1 corresponding to 35 pulses is equivalent to one rotation of the rotation transferring gear 23. The reciprocating shaft 24 completes one reciprocation in the Z-axis direction by one rotation of the rotating transferring gear 23.

Figure 9B:
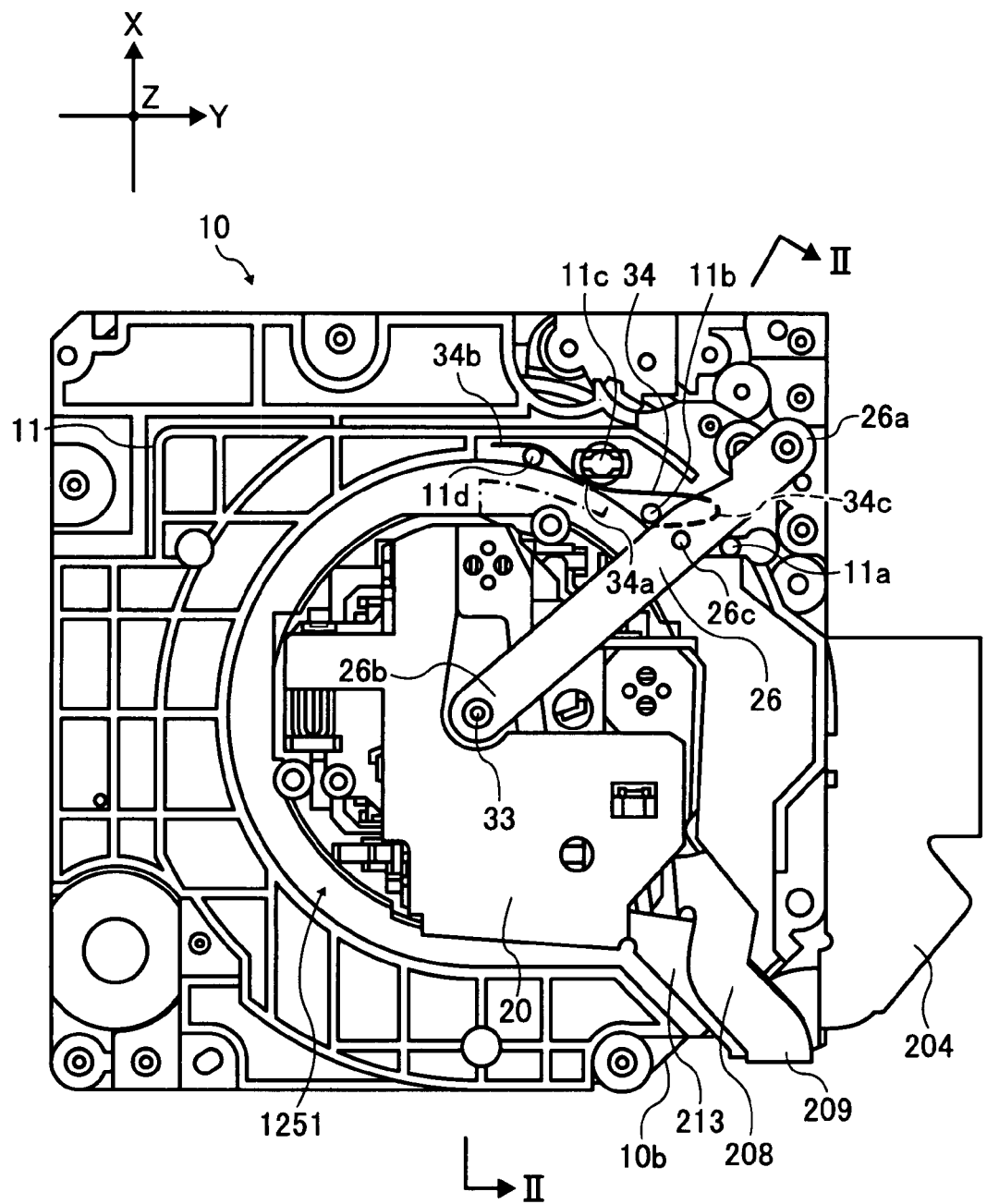
FIG. 9B is a back view of the fixation casing illustrated in FIG. 7, presenting a state where the flexible printed board is attached.
Figure 12A:
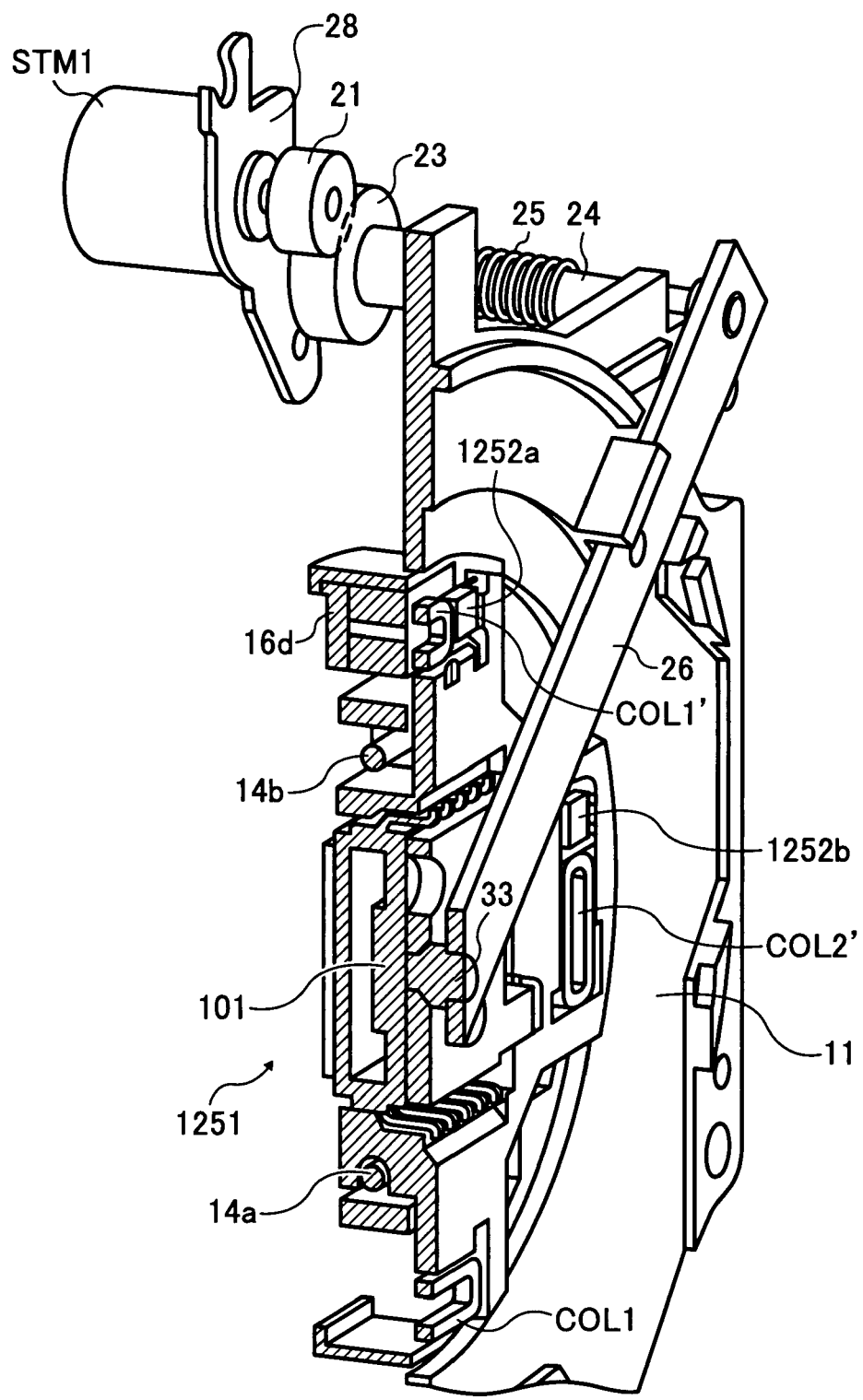
FIG. 12A is an explanation view illustrating a major portion of reference position forced retention mechanism according to the present invention, and is a perspective view illustrating connection relationship among the CCD stage, a stepping motor and a conversion mechanism.
Figure 12B:
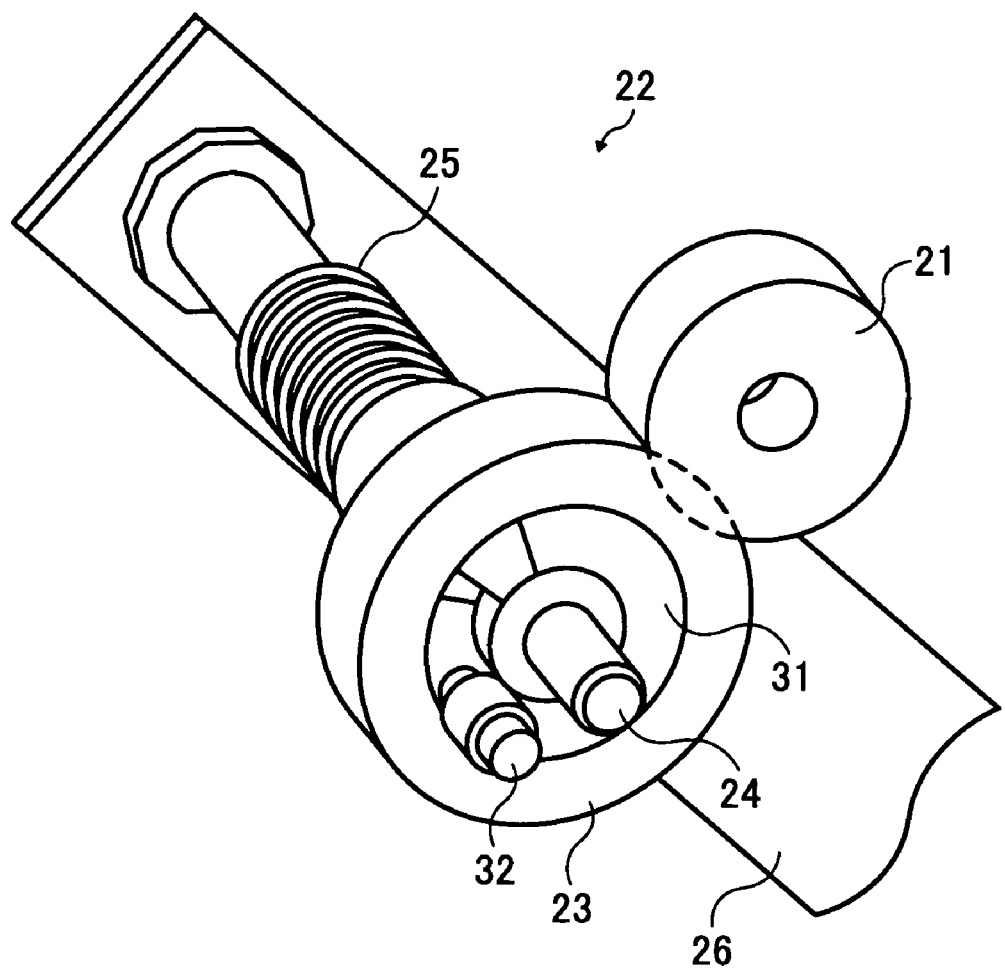
FIG. 12B is a perspective view illustrating a partly enlarged conversion mechanism.

As illustrated in FIGS. 12A, 12B, the base member 11 has a back plane side provided with the forced retainer plate 26, which roughly extends toward the center of CCD 101 as shown in FIGS. 9A, 9B. The forced retainer plate 26 has an end portion 26a fastened to one end portion of the reciprocating shaft 24. The forced retainer plate 26 has a free end portion 26b to which a taper shaped retainer pin 33 is fastened. A guide shaft 26c is formed to project in the middle of the extending direction of the forced retainer plate 26.

The base member 11 is provided with positioning projections 11a, 11b, a coil attachment projection 11c and an engagement projection 11d. The coil attachment projection 11c is provided with a winded portion 34a of a torsion coil spring 34. The torsion coil spring 34 has one end portion 34b engaged with the engagement projection 11d and the other end portion 34c engaged with the guide shaft 26c. The base member 11 is formed with a guide hole (not shown) which guides the guide shaft 26c.

The forced retainer plate 26 has contact with the positioning projection 11a by the torsion coil spring 34 while reciprocating in the direction (Z-direction) leaving or approaching with respect to the base member 11 along the reciprocation of the reciprocating shaft 24. The guide shaft 26c functions to stabilize the reciprocation of the forced retainer plate 26.

Figure 10:
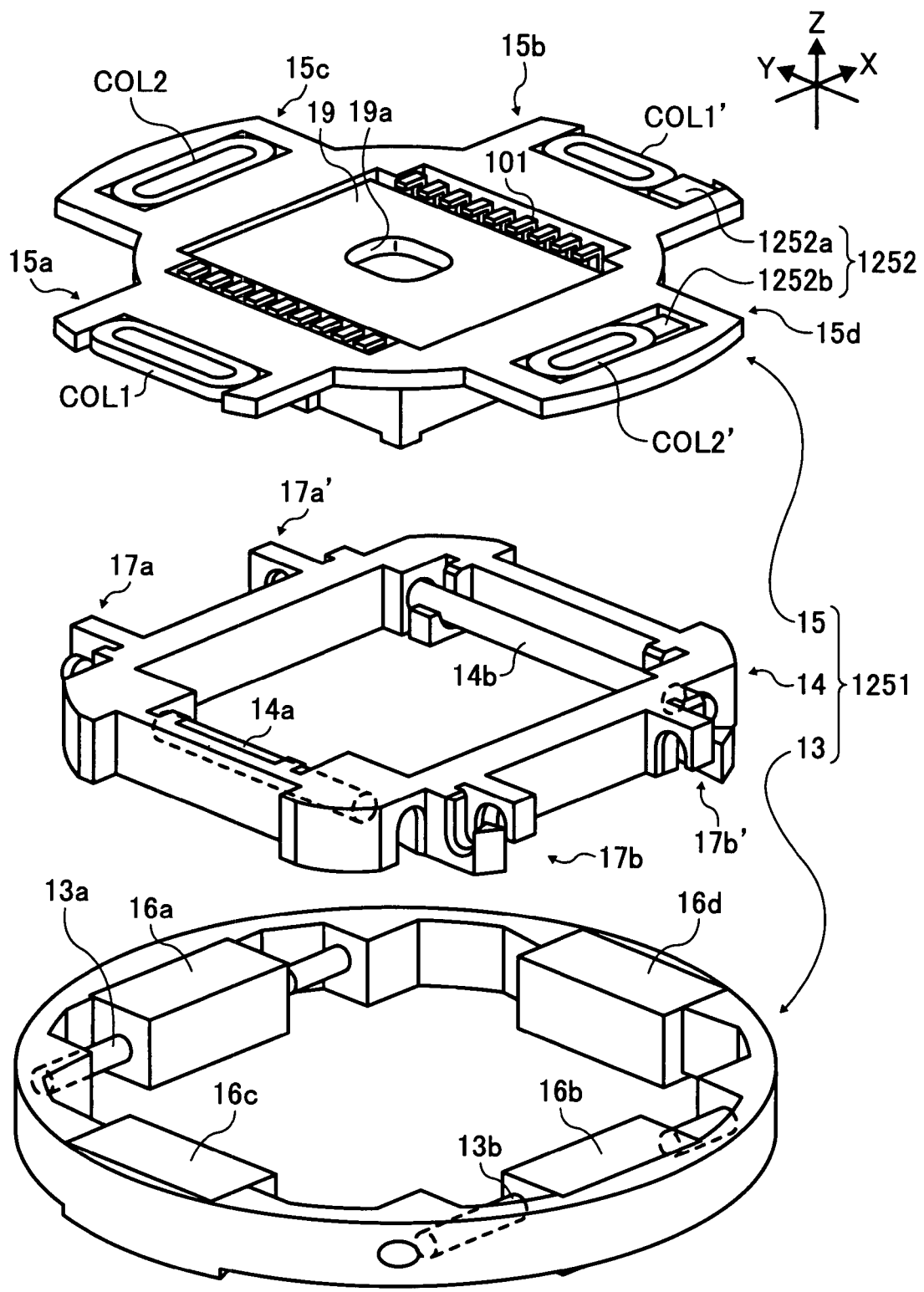
FIG. 10 depicts an exploded perspective view of a CCD stage according to the present invention.
Figure 14A:
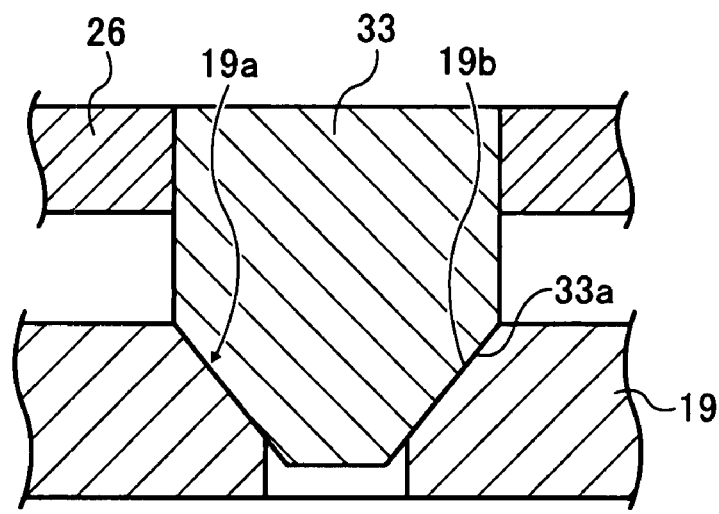
FIG. 14A is an explanation view for explaining a state that the retainer pin presented in FIG. 12A is fitted to the concave portion, illustrating a partly enlarged cross section view presenting a state that the retainer pin is closely fitted to the circumference wall of concave portion.
Figure 14B:
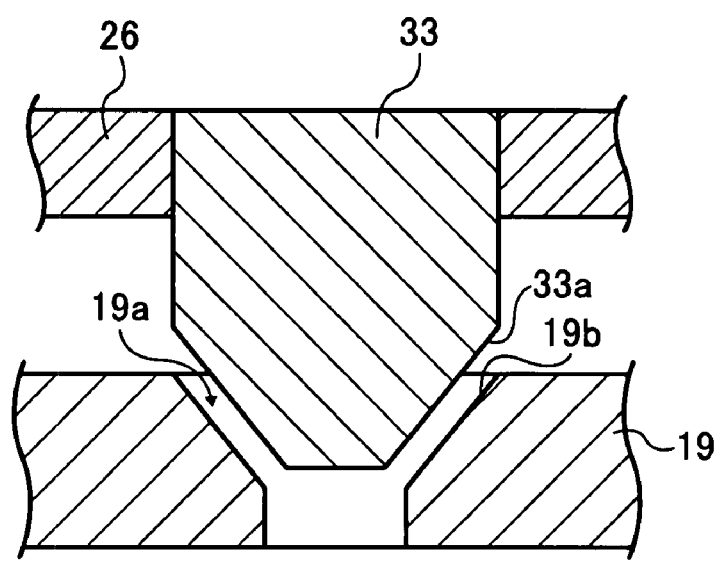
FIG. 14B illustrates a partly enlarged cross section view presenting a state that the retainer pin is separated from the circumference wall of concave portion.

The retainer pin (fitting projection) 33 fits into the concave portion (fitting hole) 19a as presented in FIG. 10 so as to fulfill the function for mechanically retaining the mounting stage 16 on the position of the reference position or the original position O. As illustrated in the enlarged view of FIG. 14A, a stage that a peripheral wall 33a of the retainer pin 33 is closely fitted to a peripheral wall 19b of the concave portion 19a of the protection plate 19 corresponds to the holding standby position of the cam pin 32. As illustrated in the enlarged view of FIG. 14B, a stage that the peripheral wall 33a of the retainer pin 33 is separated from the peripheral wall 19b of the concave portion 19a of the protection plate 19 at the maximum intervals corresponds to the release standby stage of the cam pin 32. The holding standby position of the cam pin 32 is also the forced reference position of the mounting stage 15.

Since the peripheral wall 19b of the concave portion 19a of the protection plate 19 comprises a taper shape, the cam pin 32 can be held in the holding standby position if a gap is developed between the cam pin 32 and the concave portion 19a.

(Folding of Printed Board)

Figure 15:
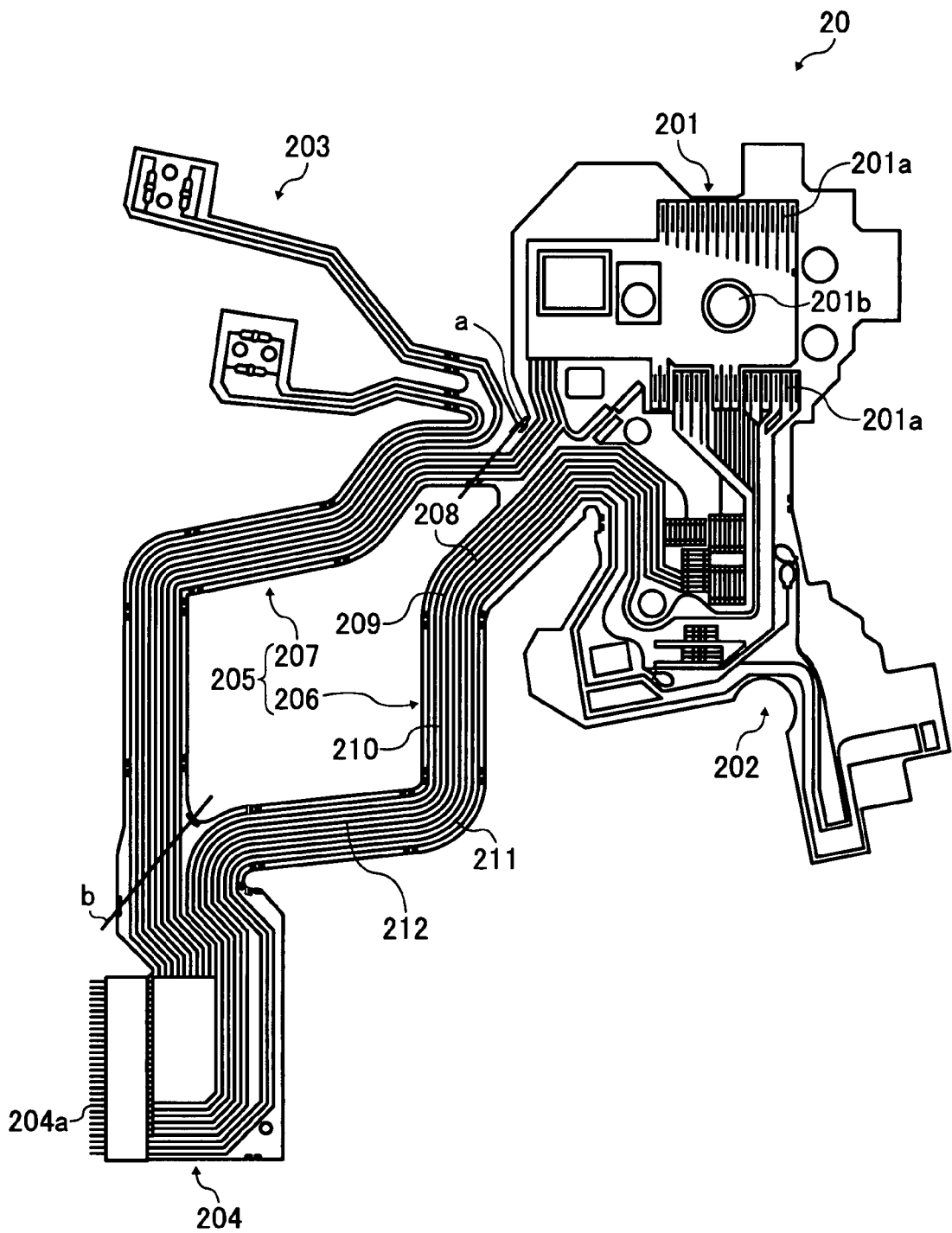
FIG. 15 is an upper side view presenting the flexible printed board before being bent.
Figure 16:
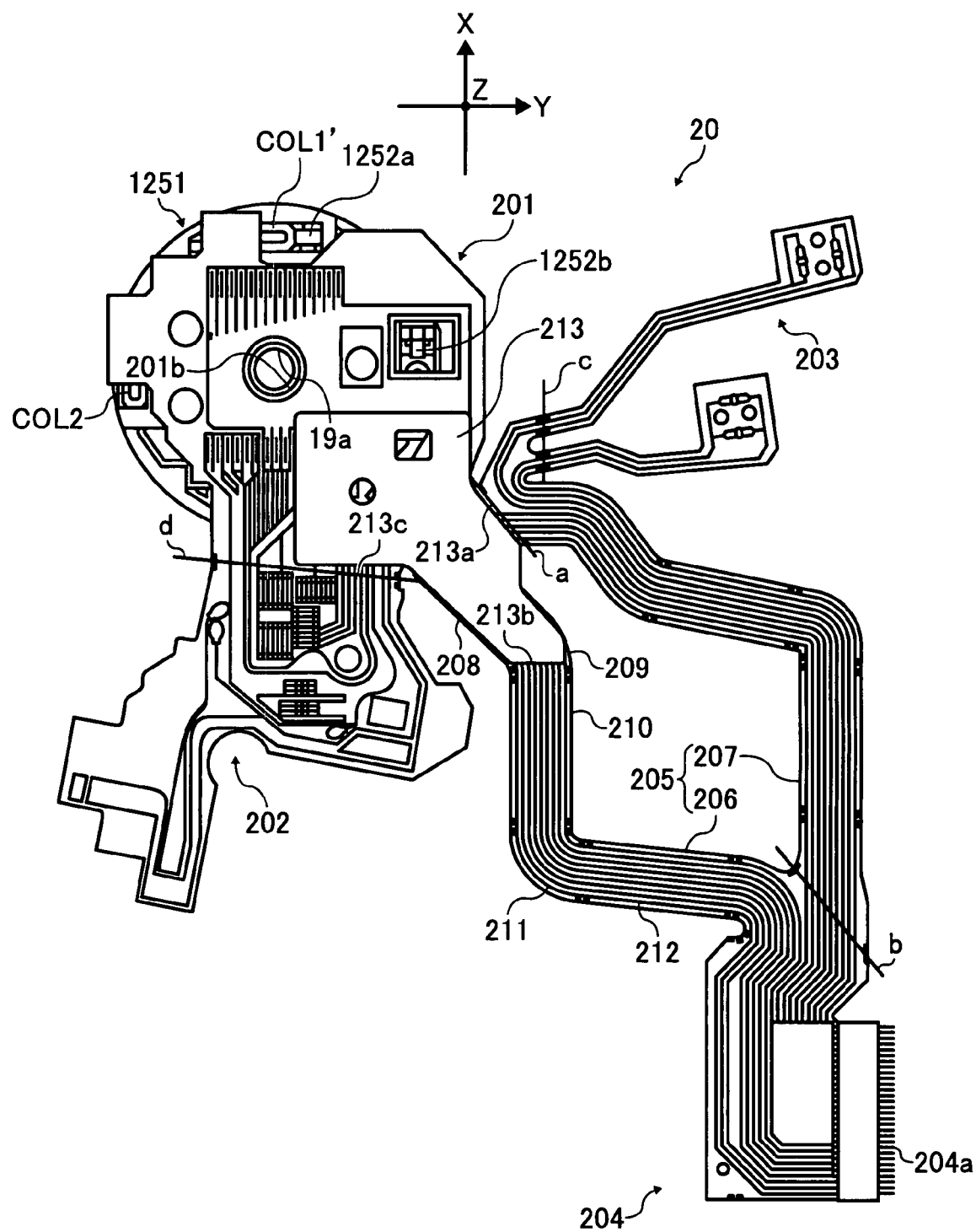
FIG. 16 is a view illustrating a state that the flexible printed board before being bent is attached to the CCD stage.

The flexible printed board 20 illustrated in FIG. 15 (hereinafter referred to as a printed board 20) comprises a CCD connection portion 201, a coil connection portion 202, a position detection element connection portion 203, a block circuit connection portion 204 and a connection extension portion 205. FIG. 15 is the development view of printed board 20 seen from the upper side of the CCD connection portion 201 and FIG. 16 is the development view of printed board 20 seen from the under side of the CCD connection portion 201, illustrating the printed board 20 attached onto the CCD stage 1251.

As presented in FIG. 15, the CCD connection portion 201 comprises a connection pattern portion 201a corresponding to a connection pin of the CCD 101 and a through hole 201b corresponding to the concave portion 19a of the protection plate 19. Moreover, the coil connection portion 202 is provided with a connection pattern portion (not shown) which is electrically connectable to each of the coil bodies COL1, COL1', COL2, COL2' (hereinafter, referred to as each of the coil bodies COL). Furthermore, the position detection element connection portion 203 is provided with a connection pattern portion (not shown) which is electrically connectable to the position detection element 1252. The block circuit connection portion 204 comprises a connection pattern portion 204a which is electrically connected to the F/E-IC 102, operational amplifier 1253, and coil driver 1254. The system block circuit is, thereby, electrically connected to the CCD connection portion 201, coil connection portion 202 and position detection element connection portion 203 through the connection extension portion 205.

In the present embodiment, the connection extension portion 205 is configured to branch into a first connection extension portion 206 and a second connection extension portion 207. The second connection extension portion 207 is configured to overlap with the first connection extension portion 206 when folding the connection extension portion 205 along the straight lines a, b. The second connection extension portion 207 has the same structure as that of the first connection extension portion 206 when reversing the upper side and the under side of the second connection extension portion 207; thus, the detailed explanations will be omitted.

The first connection extension portion 206 comprises a first straight line portion 208, a first curved portion 209, a second straight line portion 210, a second curved portion 211 and a third straight line portion 212. The first straight line portion 208 extends from the CCD connection portion 201, which is disposed in the back plane of CCD 101 when being assembled, in the direction (the direction toward the corner portion 10b) inclined at about 45 degrees with respect to the Y-axis direction and X-axis direction (reference to FIG. 16). The first curved portion 209 comprises a fan shape as a whole, and its apex angle is about 45 degrees, linking the first straight line portion 208 and the second straight line portion 210 without changing their width dimension. The second straight line portion 210 extends along the X-axis direction. The second curved portion 211 comprises a fan shape as a whole, and its apex angle is about 90 degrees, linking the second straight line portion 210 and the third straight line portion 212 without changing their width dimension. The third straight line portion 212 is configured to have the length the same as that of the second straight line portion 210, and extend along the direction orthogonal to the second straight line portion 210, i.e., the Y-axis direction.

Next, the attachment of printed board 20 is described.

As depicted in FIG. 16, the printed board 20 is attached to the CCD stage 1251 from the protection plate side 19 in a position that the connection pattern portion 201a of CCD connection portion 201 conforms to the connection pin of CCD 101 and the through-hole 201b conforms to the concave portion 19a.

Attached onto the printed board 20 is an FPC auxiliary plate 213 comprising a plate member, and its shape being suitable for a part of the CCD connection portion 201 and the shapes of first straight line portion 208 and first curved portion 209 of the first connection extension portion 206. The FPC auxiliary plate 213 is provided with a first side portion 213a along the straight line a, a second side portion 213b along the border line between the first curved portion 209 and the second straight line portion 210 and a third side portion 213c along an after-mentioned line d, so as to support the folding of the printed board 20.

Figure 17:
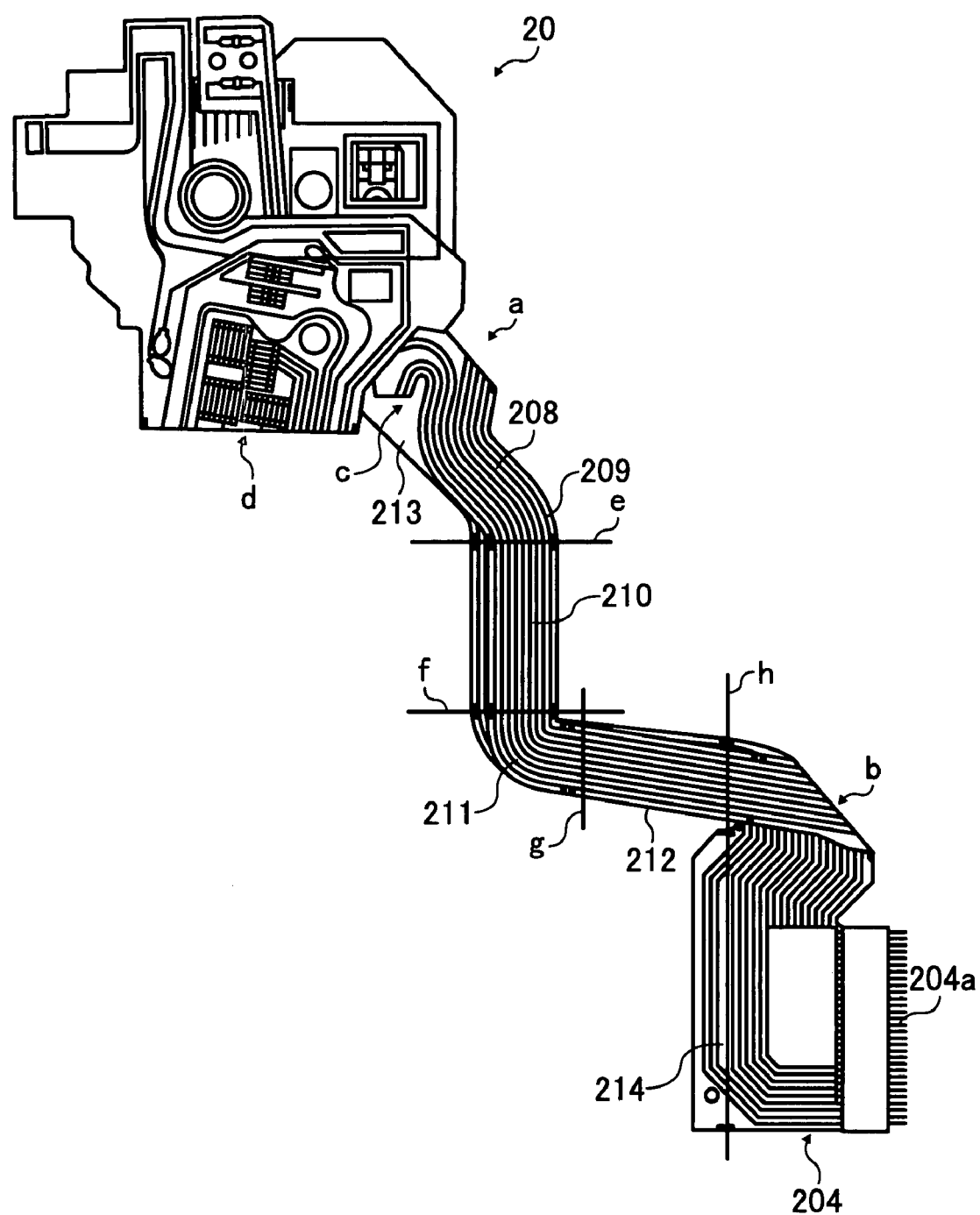
FIG. 17 is a view illustrating a state that a connection extension portion of the printed board is overlapped.
Figure 18A:
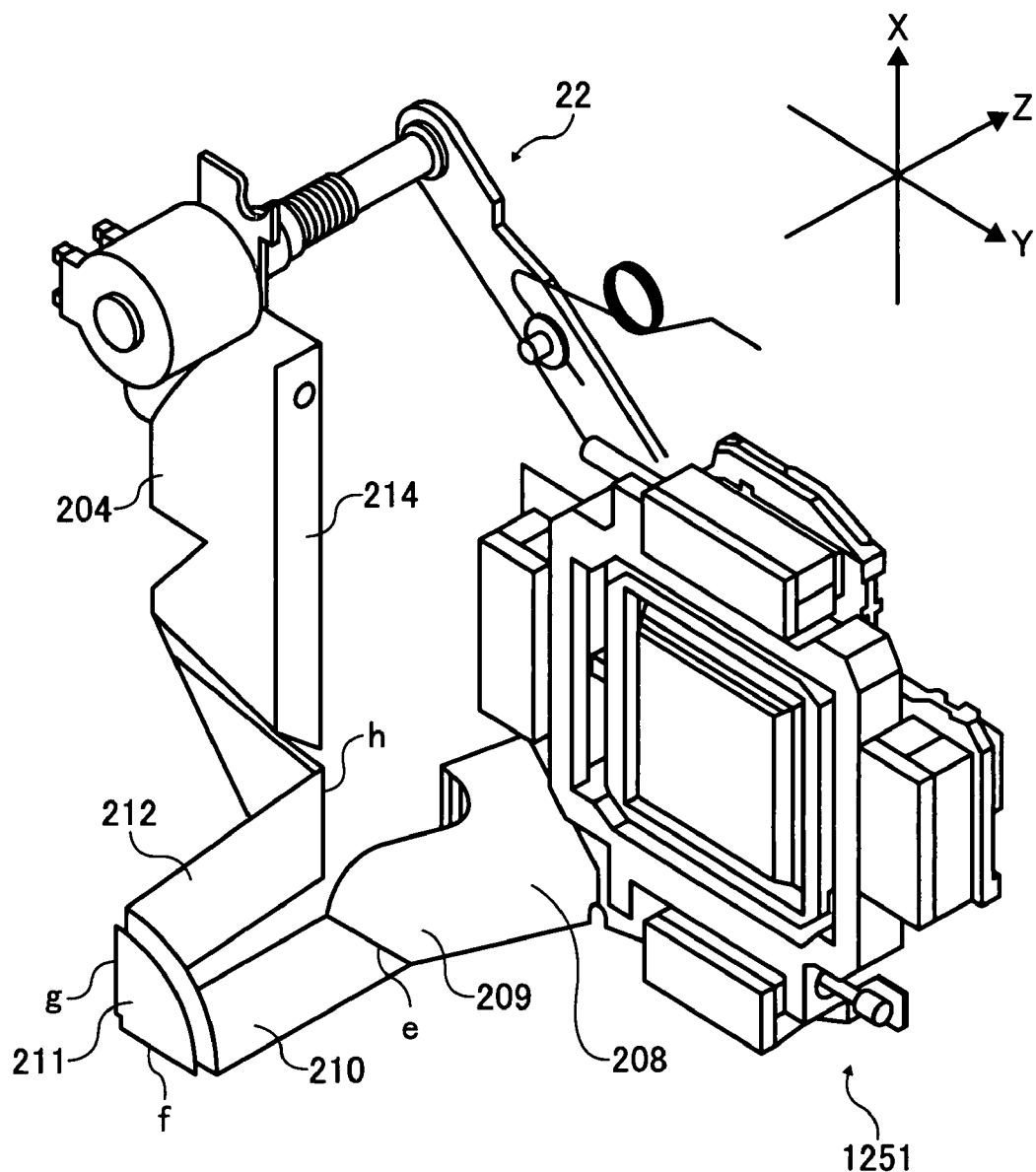
FIGS. 18A-18C are perspective views presenting location relationship between the CCD stage and the flexible printed board, each of them are seen from a different direction.
Figure 18B:
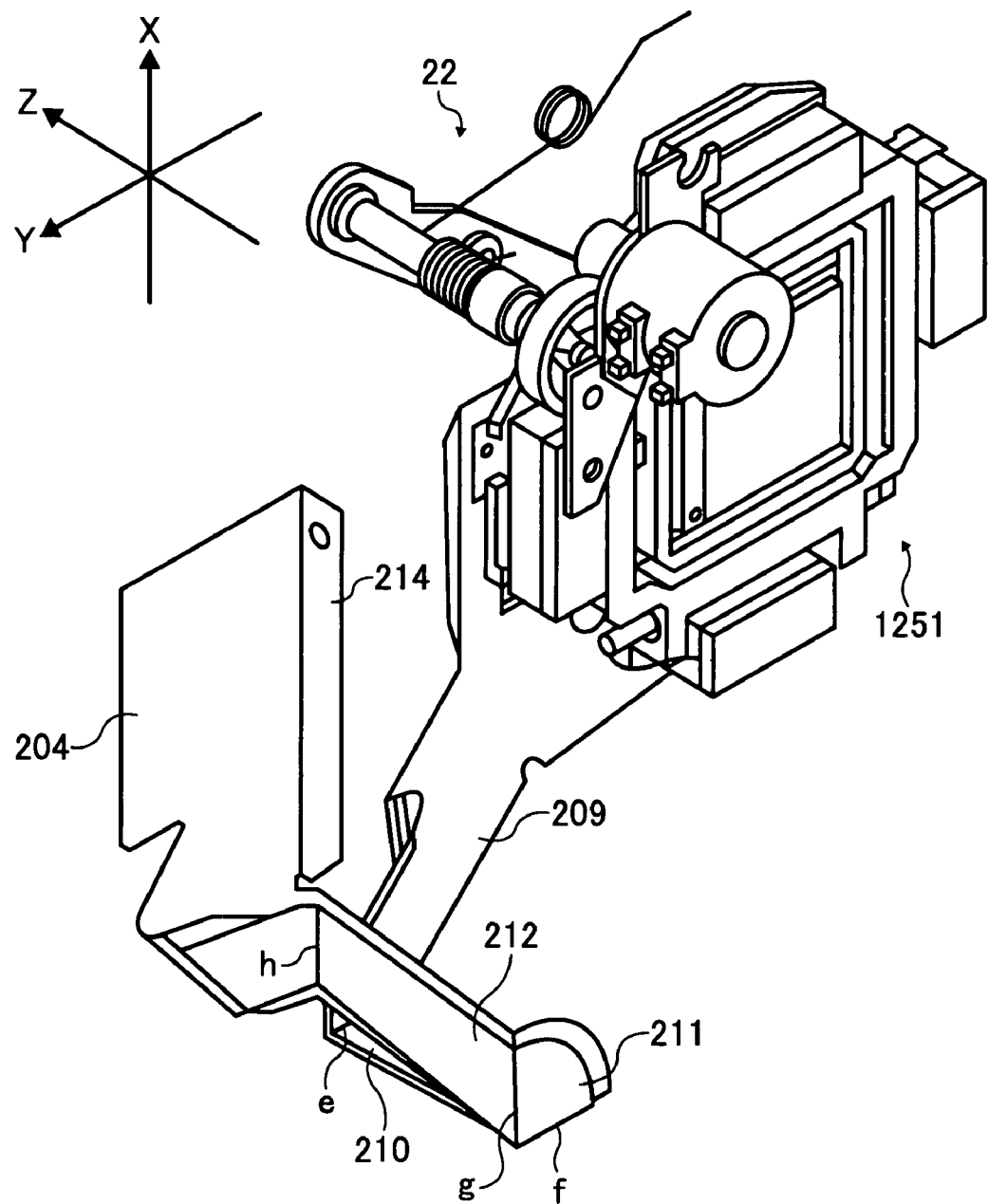
Figure 18C:
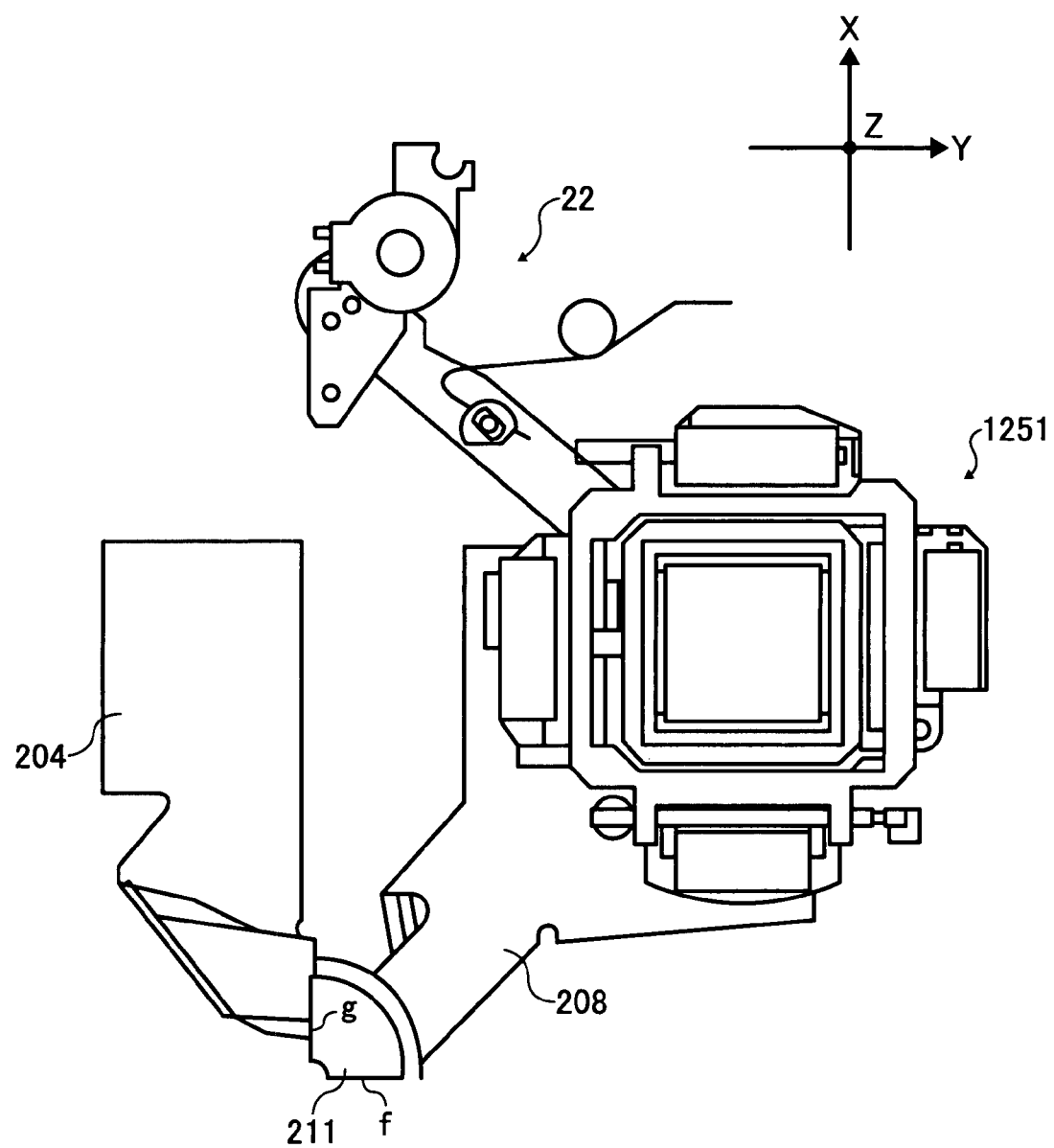

The printed board 20 is folded with the straight lines a, b as the fold lines so that the second connection extension portion 207 overlaps with the first connection extension portion 206 to sandwich the FPC auxiliary plate 213 therebetween (reference to FIG. 17).

The printed board 20 is folded with the straight line c as the fold line so that the position detection element connection portion 203 overlaps with the CCD connection portion 201 to electrically connect the position detection element connection portion 203 to the position detection element 1252 (reference to FIG. 17).

The printed board 20 is folded with the straight line d as the fold line so that the coil connection portion 202 overlaps with the CCD connection portion 201 to electrically connect the coil connection portion 202 to each of the coil bodies COL (reference to FIG. 17). According to the above described steps, the printed board 20 is attached to the CCD stage 1251 to locate within the X-Y plane on the base member 11 as illustrated in FIG. 17.

Next, as illustrated in FIGS. 9B, 11, 18A, 18B, the printed board 20 is roughly folded at a right angle along the straight line e so that the second straight line portion 210 extends along the Y-Z plane at the corner portion 10b of the fixation casing 10.

Moreover, the printed board 20 is roughly folded at a right angle along the straight line f so that the second curved portion 211 extends within the X-Y plane displaced from the base member 11 to the lens barrel side of the Z-axis direction and also extends toward the side of fixation casing 10.

Next, the printed board 20 is roughly folded at a right angle along the straight line g so that the third straight line portion 212 extends along the X-Z plane at the corner portion 10b of the fixation casing 10.

The printed board 20 is roughly folded at a right angle along the straight line h so that the block circuit connection portion 204 extends along the X-Y plane in the outside of the fixation casing 10. The block circuit connection portion 204 is attached to the base member 11 through a folding portion 214, which is formed by the folding along the straight line h and extends along the X-Z plane (reference to FIGS. 7, 9B, 18A, 18B).

When performing the image blur suppression, the mounting stage 15 moves within the X-Y plane on the base member 11, so the relative distance between the mounting stage connection side fastened to the mounting stage 15 and the block circuit connection side 204 fastened to the base member 11 is changed in the printed board 20. In order to prevent the force resulted from the change in the relative distance therebetween, which disturbs the movement of mounting stage 15, the printed board 20 has the second straight line portion 210 existing within the Y-Z plane and the third straight line portion 212 existing within the X-Y plane, which are located orthogonal to each other. Since the printed board 20 easily deforms in its thickness direction, the force in the X-axis direction is absorbed by the bending deformation of the second straight line portion 210, and also the force in the Y-axis direction is absorbed by the bending deformation of the third straight line portion 212, as a result, the force resulted from the change in the distance caused within the X-Y plane can be absorbed.

Since the printed board 20 has the second curved portion 211 existing within the X-Y plane surrounded by the second straight line portion 210, third straight line portion 212, and fixation casing 10, the second straight line portion 210 bends into C-shape which expands in one direction, if the force is applied to the folding portion (straight line e) between the mounting stage connection side and the second straight line portion 210 by the movement of mounting stage 15, as a result, the distortional stress can be reduced. Therefore, the repulsive force can be reduced, and the force resulted from the movement of mounting stage 15 can be effectively absorbed. On the other hand, if the printed board 20 has the second curved portion 211 existing within the X-Y plane in the outside of the space surrounded by the second straight line portion 210, third straight line portion 212 and fixation casing 10, the second straight line portion 210 bends into S-shape which expands in the opposite two directions by the force applied to the folding portion (straight line e), as a result, the distortional stress is relatively increased. Therefore, the repulsive force can be increased, and the absorbed amount of the force resulted from the movement of mounting stage 15 can be reduced. The same thing will happen to the third straight line portion 212 which absorbs the force in the Y-axis direction. Accordingly, the printed board 20 does not disturb the movement of mounting stage 15 within the X-Y plane when the image blur suppression is performed.

The printed board 20 has its folding portion formed along the Z-axis direction at the corner portion 10b of the fixation casing 10, so the space around the lens barrel comprising a general circular form, i.e., the corner portion 10b of the fixation casing 10 can be effectively used (reference to FIG. 7). The growing in the camera size caused by providing a folding portion can be accordingly prevented.

Since the printed board 20 is provided with the connection extension portion 205 branched into the first connection extension portion 206 and the second connection extension portion 207 which can overlap each other, it is possible to increase the number of electrical transmission paths without increasing the width of connection extension portion 205, and it is possible to provide the folding portions within the limited space of the corner portion 10b of the fixation casing 10. Therefore, it is not necessary to provide the second extension portion 207, if the number of electric transmission paths is not many.

The printed board 20 is provided with the FPC auxiliary plate 213, so the printed board 20 is not bent in the place from the CCD connection portion 201 of the printed board 20 to the first curved portion 209 via the first straight line portion 208, and the force resulted from the movement of mounting stage 15 can be transferred to the third straight line portion 212, as a result, the force can be securely absorbed in the folding portions.

(Retention Control Circuit of Suppression Mechanism)

Figure 19:
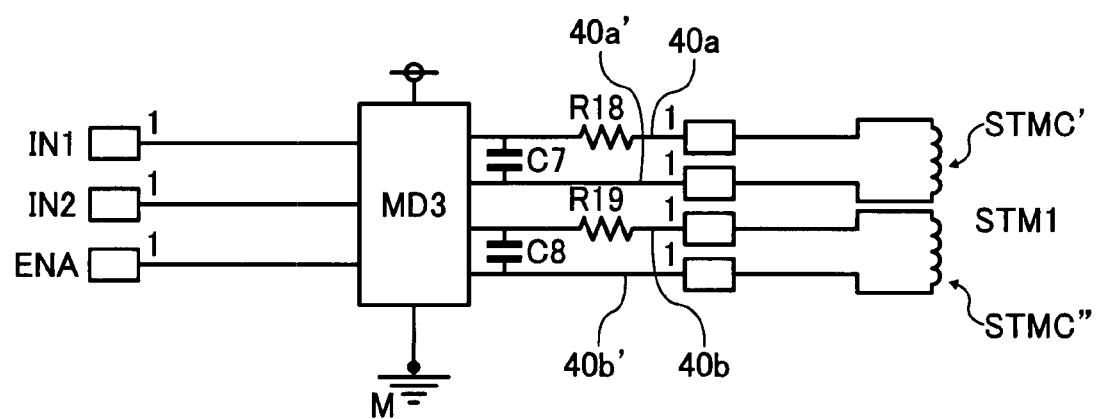
FIG. 19 depicts a block circuit diagram of a reference position forced retention control circuit according to the present invention.

The stepping motor STM1 is controlled by a retention control circuit illustrated in FIG. 19. The stepping motor STM1 comprises a two-phase control structure, and includes a first coil STMC' having terminals connected to the motor driver MD3 via output lines 40a, 40a' and a second coil STMC" having terminals connected to the motor driver MD3 via output lines 40b, 40b'. The output line 40a is provided with a resistance for limiting current R18, and also the output line 40b is provided with a resistance for limiting current R19. A capacitor C7 is disposed between the output line 40a and the output line 40a' and a capacitor C8 is also disposed between the output line 40b and the output line 40b'.

Retention control signals are input to the motor driver MD3 from ports IN1, IN2 of the processor 104, and an enable signal is input to a port ENA of the processor 104. The motor driver MD3 controls the power distribution to the stepping motor STM1 based on the retention control signals and the enable signal.

Figure 20:
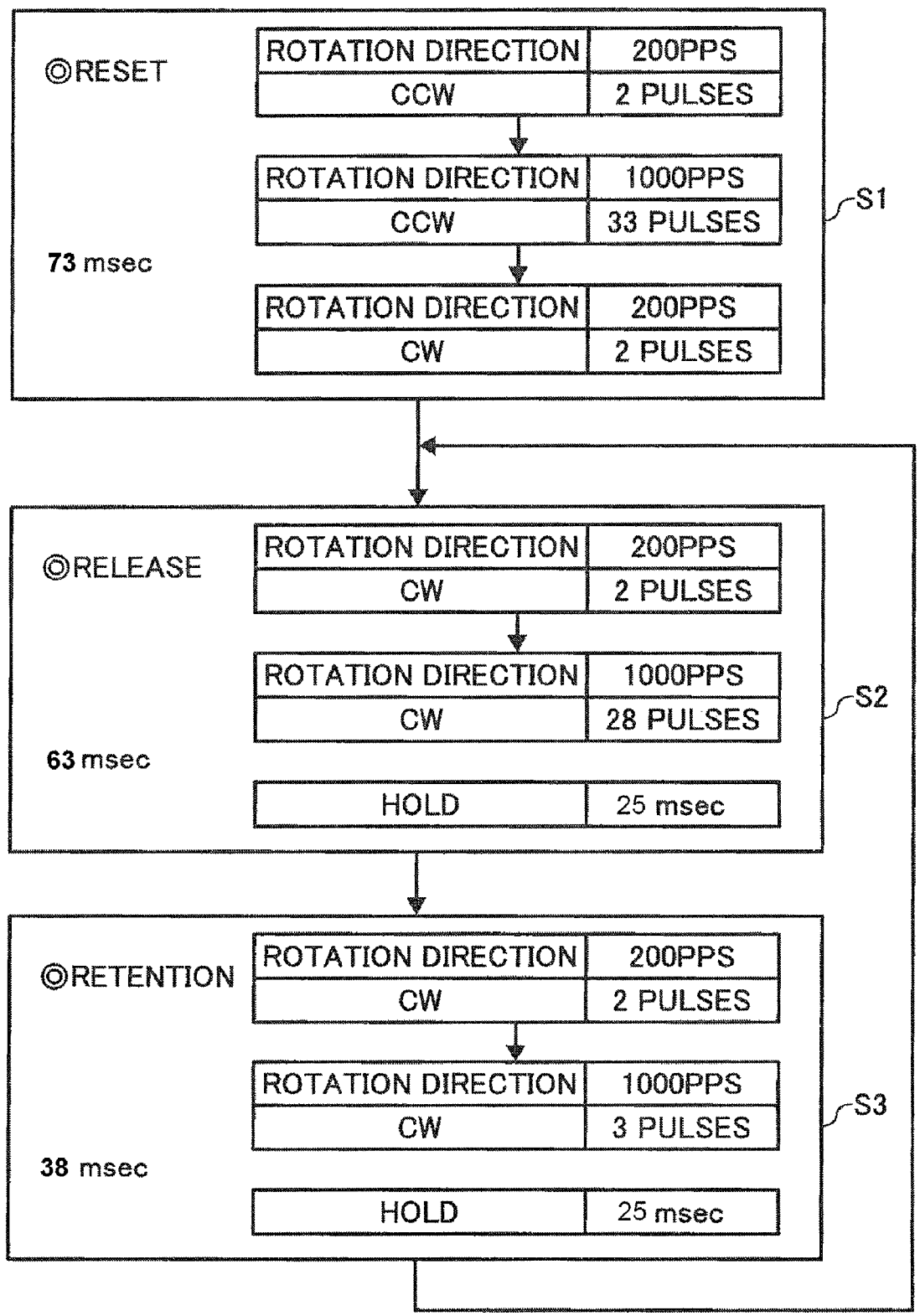
FIG. 20 a flow chart illustrating one example of a control process of an original position forced retention mechanism of a mechanism for suppressing an image blur according to the present invention.

FIG. 20 is a flow chart for explaining the operation of the retention control circuit, illustrating three steps such as a reset process, a release process and a retention process.

When the power switch SW13 of digital camera is turned on, at first, the reset process is performed according to the control of processor 104 (S.1). In this reset process, the stepping motor STM1 rotationally drives according to 2 pulses in the counter-clockwise direction at a slow rate of 200 pps (pulse per second) by the control of processor 104. Next, the stepping motor STM1 rotationally drives according to 33 pulses in the counter-clockwise direction at a fast rate of 1000 pps (pulse per second). Finally, the stepping motor STM1 rotationally drives according to 2 pulses in the clockwise direction at a slow rate of 200 pps (pulse per second).

Wherever the cam pin 32 is in the rotation direction of the cam groove 31, the cam pin 32 physically has contact with the steep cliff 31d of the cam groove 31 by rotating the stepping motor STM1 according to 35 pulses in the counter-clockwise direction.

Figure 13A:
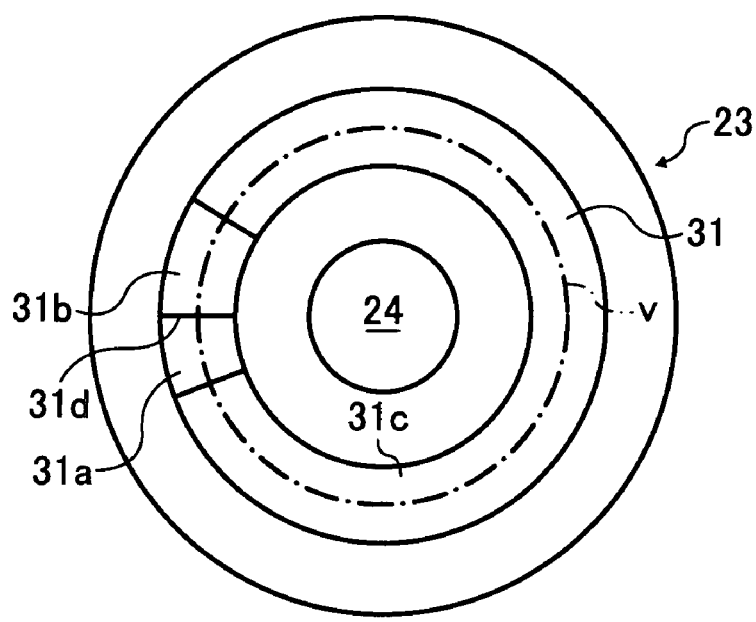
FIG. 13A is a pattern diagram of a cam groove of a rotation transferring gear, presenting a bottom plane view of the rotation transferring gear.
Figure 13B:
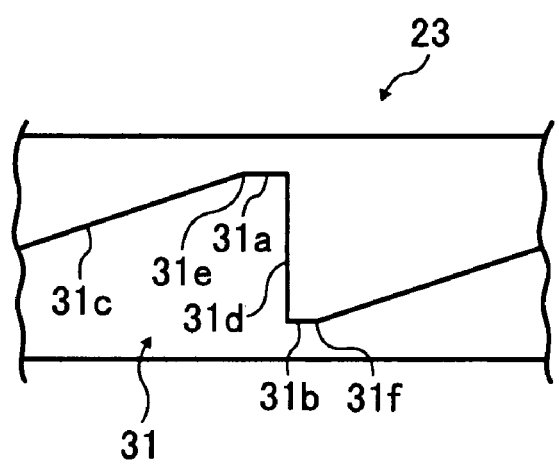
FIG. 13B is a view illustrating a cross section obtained along the circulated one-point dotted line V presented in FIG. 13A.
Figure 13C:
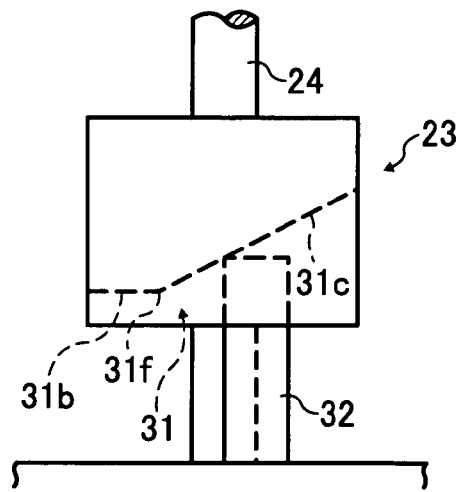
FIG. 13C illustrates a state that the cam pin slides the inclined surface portion of cam groove, and the rotation transferring gear is pushed up toward the base member.

If the stepping motor STM1 drives according to 2 pulses in the clockwise direction from the contact position, the cam pin 32 is set in the incline start position 31e of the cam groove 31 (reference to FIG. 13C). The state that the cam pin 32 is set in the incline start position 31e of the cam groove 31 is the reset position which corresponds to the state that the CCD 101 is forcibly retained in the reference position or the original position O. The reference position or the original position O is the central position of the movable area of the mounting stage 15. The time required from the power on to the completion of reset is about 73 msec (millisecond).

In this suppression mechanism, the image blur suppression is carried out by tuning on the suppression switch SW14, and the image blur suppression is released at the same time as the suppression switch SW14 is turned off or the photographing is completed.

If the suppression switch SW14 is turned on, the release process is performed by the control of the processor 104 (S2). In this release process, at first, the stepping motor STM1 rotationally drives according to 2 pulses in the clockwise direction at a slow rate of 200 pps (pulse per second). Next, the stepping motor STM1 rotationally drives at 28 pulses in the clockwise direction at a fast rate of 1000 pps (pulse per second). Finally, the power distribution to the stepping motor STM1 is maintained for 25 msec (millisecond). Next, the power distribution to the stepping motor STM1 is stopped by the motor driver MD1.

Figure 13D:
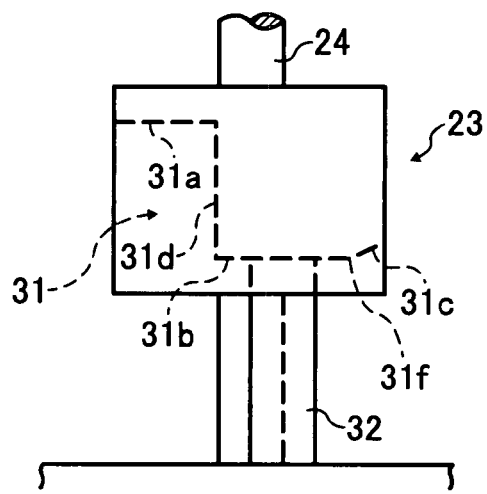
FIG. 13D illustrates a state that the cam pin has contact with the flat top portion of cam groove, and the transferring gear is pushed up at maximum.
Figure 13E:
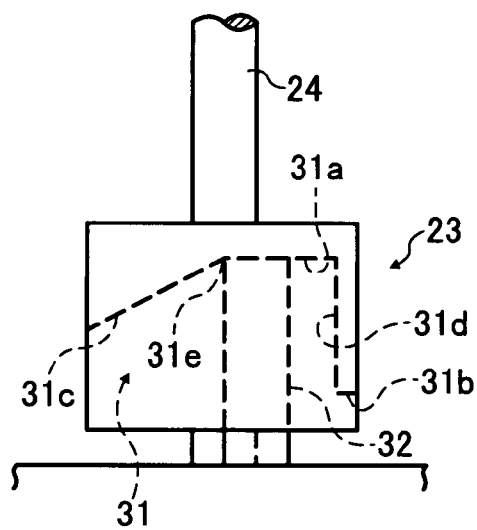
FIG. 13E illustrates a state that the cam pin passes through a steep cliff to have contact with a flat valley floor portion, and the transferring gear is pushed up at maximum.

With this release process, the cam pin 32 is located in the incline end position 3 if of the cam groove 31 (reference to FIG. 13D). The time required from the incline start position 31e to the incline end position 31f is about 63 msec (millisecond). More particularly, the time required that the cam pin 32 moves from the hold standby position to the release standby position is about 63 msec (millisecond). The camera shake correction control is performed in this release standby position.

Next, if the suppression switch SW14 is turned off or the photographing is performed, the processor 104 carries out the retention process (S3). In this retention process, the stepping motor STM1 rotationally drives according to 2 pulses in the clockwise direction at a slow rate of 200 pps (pulse per second) by the control of the processor 104, and then rotationally rotates according to 3 pulses in the clockwise direction at a fast rate of 1000 pps (pulse per second). The cam pin 32, thereby, comes down to the flat valley floor portion 31a by passing through the flat peak portion 31b of the cam groove 31 to have contact with the flat valley floor portion 31a. After that, the power distribution to the stepping motor STM1 is maintained for 25 msec (millisecond).

Next, the motor drive MD1 stops the power distribution to the stepping motor STM1. The cam pin 32 is, therefore, set in the incline start position 31e of the cam groove 31, and the central position of CCD 101 retained. While the power is supplied, if the reset process is performed, these release process and retention standby process are carried out. Moreover, the time required that the cam pin 32 moves from the release standby position to the retention standby position is about 38 msec (millisecond).

Since the suppression mechanism includes the structure for forcibly retaining the mounting stage 15 of CCD 101 in the central position by the retainer pin 33 formed in the forced retainer plate 26, it is not necessary to control the power distribution for keeping the retention of the mounting stage 15 in the position of original position; thus, the power consumption can be reduced when operating the suppression mechanism.

(Circuit Structure of Camera Shake Detection Circuit)

Figure 21:
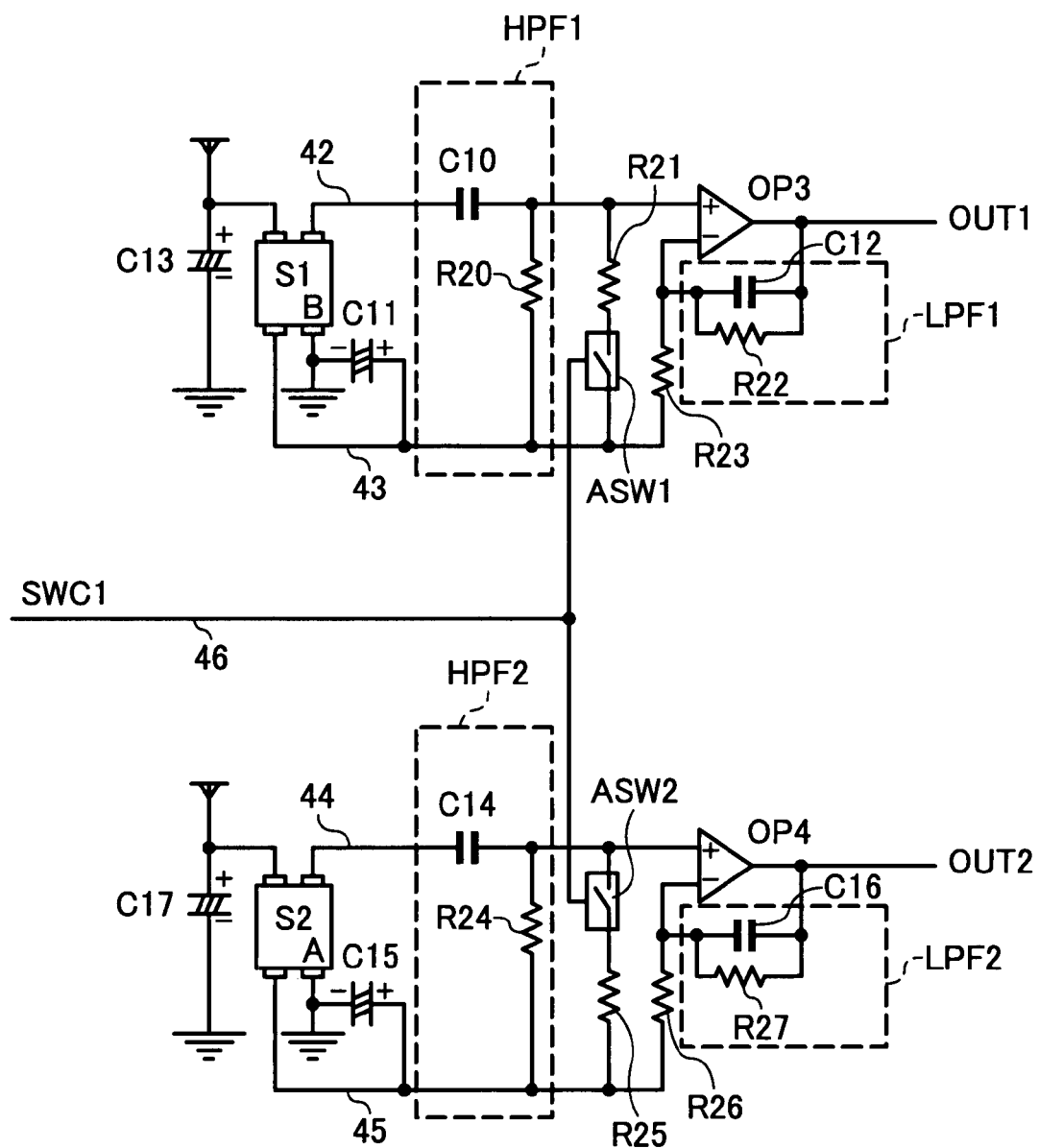
FIG. 21 depicts a circuit diagram presenting one example of a camera shake detection circuit according to the present invention.

FIG. 21 is a view illustrating a circuit structure of camera shake detection circuit. The camera shake detection circuit comprises a pitch direction rotation detection portion, which detects the rotation in the pitch direction, and a yaw direction rotation detection portion, which detects the rotation in the yaw direction.

The pitch direction rotation detection portion comprise, for example, a piezoelectric vibration gyro sensor S1B having a first terminal grounded via a capacitor C13, a second terminal connected to a positive terminal of an operational amplifier OP3 via a capacitor C10 provided in a connection line 42, a third terminal connected to a negative terminal of the operational amplifier OP3 via a resistance R23 provided in a connection line 43, and a fourth terminal grounded and also connected to the connection line 43 via a capacitor C11.

The operational amplifier OP3 has the positive terminal connected to the connection line 43 via a resistance R20. A series body comprising a resistance R21 and a switching switch ASW1 is connected between the connection line 42 and the connection line 43 in parallel with the resistance R20.

The operational amplifier OP3 has an output terminal connected to a negative terminal of the operational amplifier OP3 via a capacitor C12 to which a resistance R22 is connected in parallel with the capacitor C12. The capacitor C10 and the resistance R20 make up a high-pass filter HPF1, and the capacitor C12 and the resistance R22 make up a low-pass filter LPF1. The operational amplifier OP3 amplifies the output of piezoelectric vibration gyro sensor S1B by a resistance R23 and the resistance R22 to output a pitch direction detection signal OUT1 from the output terminal of operational amplifier OP3.

The yaw direction rotation detection portion comprises a piezoelectric vibration gyro sensor S2A having a first terminal grounded via a capacitor C17, a second terminal connected to a positive terminal of an operational amplifier OP4 via a capacitor C14 provided in a connection line 44, a third terminal connected to a negative terminal of the operational amplifier OP4 via a resistance R26 provided in a connection line 45, and a fourth terminal grounded and also connected to the connection line 45 via a capacitor C15.

The operational amplifier OP4 has the positive terminal connected to the connection line 45 via a resistance R24. A series body comprising a resistance R25 and a switching switch ASW2 is connected between the connection line 44 and the connection line 45 in parallel with the capacitor C16. The capacitor C14 and the resistance R24 make up a high-pass filter HPF2, and the capacitor C16 and the resistance R27 make up a low-pass filter LPF2. The operational amplifier OP4 amplifies the output of piezoelectric vibration gyro sensor S2A by a resistance R26 and the resistance R27 to output a yaw direction detection signal OUT2 from the output terminal of operational amplifier OP4. The high pass filter HPF2 has, a function removing a part of direct current to prevent swinging of the image and the low pass filter LPF2 has a function removing a noise signal to improve image quality.

A switching control signal SWC1 is into to the switching switches ASW1, ASW2 via a signal line 46. Each of the switching switches ASW1, ASW2 includes a function for accelerating the charge of each of the capacitors C11, C15, so as to increase the response speed of each of the high-pass filters HPF1, HPF2. The processor 104 outputs the switching control signal SWC1 to the switching switches ASW1, ASW2 for a predetermined time after turning on the power; thus, the switching switches ASW1, ASW2 are turned on for a predetermined time. The detection outputs OUT1, OUT2 of the gyro sensors S1B, S2A are loaded into the A/D converter 10411 every T second.

Where,

ω yaw (t) . . . instant angular velocity in YAW direction

ω pitch (t) . . . instant angular velocity in PITCH direction

θ yaw (t) . . . angular variation in YAW direction

θ pitch (t) . . . angular variation in PITCH direction

D yaw (t) . . . movement amount of image in X-direction corresponding to rotation in YAW direction.

D pitch (t) . . . movement amount of image in Y-direction corresponding to rotation in PITCH direction, θ yaw (t) and θ pitch (t) are obtained by the following relational expressions, $\theta yaw(t) = \Sigma \omega yaw(i) \cdot T$ $$\theta pitch(t) = \Sigma \omega pitch(i) \cdot T.$$

In this regard, i is a value from 0 to t.

Moreover, a focal length f is determined from a zoom point zp and a focal point fp. The following equations are established among Dyaw (t), the movement amount of image corresponding to rotation in the YAW direction, D pitch (t), the movement amount of image corresponding to rotation in the PITCH direction, θ yaw (t), the angular variation in the YAW direction, and θ pitch (t), the angular variation in the PITCH direction.

$$Dyaw(t) = f * \tan(\theta yaw(t)) \quad \text{(i)}$$

$$Dpitch(t) = f * \tan(\theta pitch(t)) \quad \text{(ii)}$$

Namely, D yaw (t), the movement amount of image in the X-direction corresponding to rotation in the YAW direction and D pitch (t), the movement amount of image in the Y-direction corresponding to rotation in the PITCH direction corresponds to the movement amount or target value as target information of CCD 101 which should be moved in the X-Y direction.

If the rotation displacements in the YAW direction and in the PITCH direction occur by the camera shake, the target value as the target information of CCD is calculated by the above (i), (ii) to drive the mounting stage 15 such that a difference between a detection value as detection information of the CCD 101 in the X-Y direction detected by the position detection element 1252 in general and the target value of the CCD 101 becomes less, for example, zero (0). This control is performed every T seconds.

In addition, if the detection output of the gyro sensors S1B, S2A is zero, the mounting stage 15 is controlled such that the CCD 101 is translational-displaced by following the translational movement displacement Xd of the camera body.

(Suppression Control Circuit)

Figure 22:
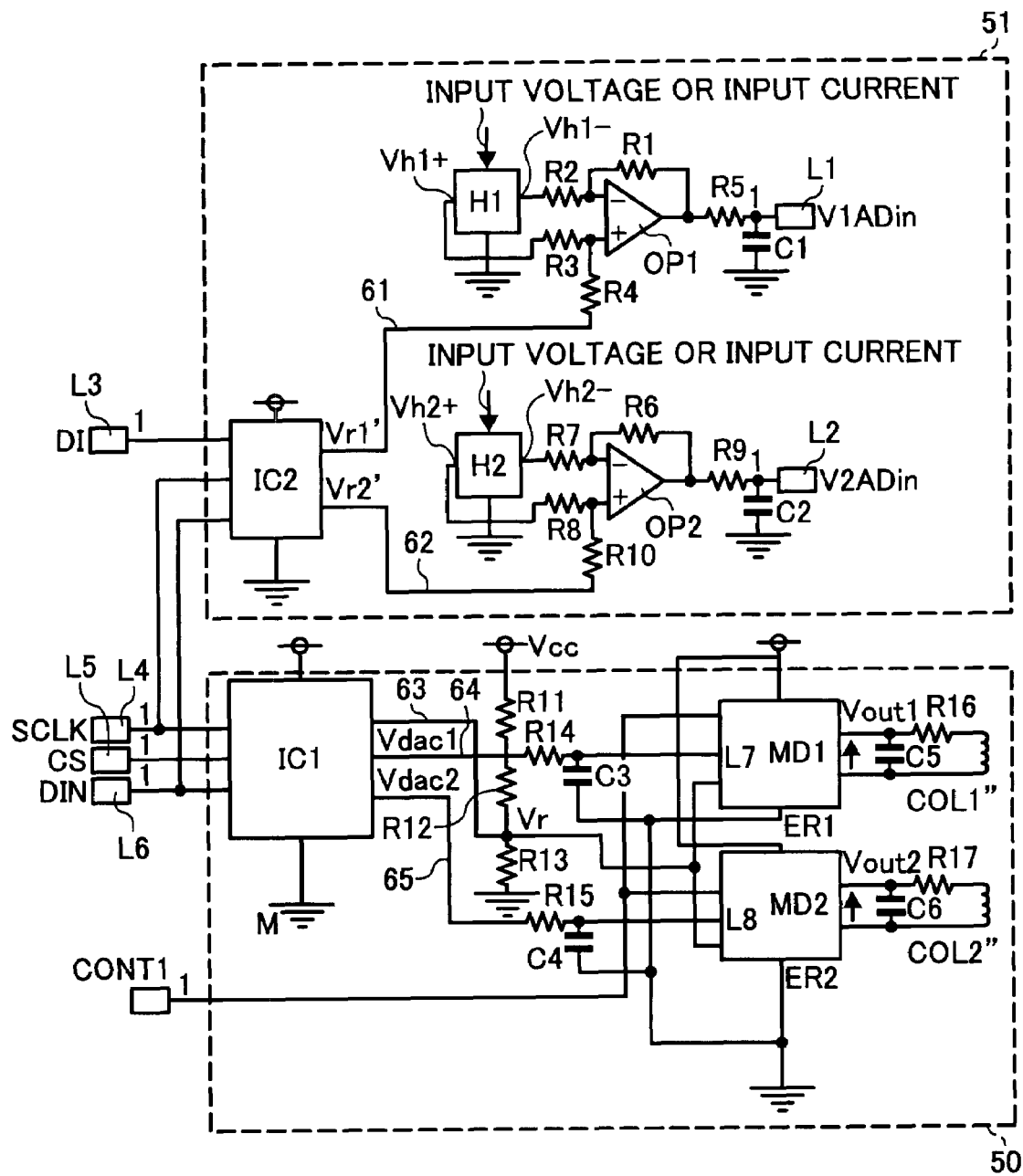
FIG. 22 depicts a block circuit diagram of a control circuit for suppressing an image blur according to the present invention.

FIG. 22 is a block diagram illustrating one example of a control circuit for suppressing an image blur. The suppression circuit comprises a feedback circuit 50 and a setting circuit 51.

The hall elements H1, H2 constitutes a part of the setting circuit 51. A predetermined input voltage or input current is applied to the hall element (1252*a*) H1. The hall element H1 has a negative terminal Vh1− connected to a negative terminal of an operational amplifier OP1 via a resistance R2 and the other terminal Vh1+ connected to a positive terminal of the operational amplifier OP1 via a resistance R3.

The operational amplifier OP1 has an output terminal connected to an input port L1 of the processor 104 via a resistance R5 and also connected to the negative terminal of the operational amplifier OP1 via the resistance R1. In addition, the connection point between the resistance R5 and the input port L1 is grounded via a capacitor C1.

A predetermined voltage or current is applied to the hall element (1252*b*) H2. The hall element H2 has one terminal Vh2− connected to a negative terminal of an operational amplifier OP2 via a resistance R7 and the other terminal Vh2+ connected to a positive terminal of the operational amplifier OP2 via a resistance R8.

The operational amplifier OP2 has an output terminal connected to an input port L2 of the processor 104 via a resistance R9 and also connected to the negative terminal of operational amplifier OP2 via a resistance R6. In addition, the connection point between the resistance R9 and the input port L2 is grounded via a capacitor C2.

The processor 104 has an output port L3 connected to a D/A conversion circuit IC2 constituting a part of the setting circuit 51, output ports L4, L6 connected to the D/A conversion circuit IC2 and the D/A conversion circuit IC1, and an output port L5 connected to the D/A conversion circuit IC1.

Connected to the D/A conversion circuit IC2 are two output lines 61, 62, one output line 61 being input to the positive terminal of operational amplifier OP1 via a resistance R4 and the other output line 62 being input to the positive terminal of operational amplifier OP2 via a resistance R10.

A chip selector signal DI from the output port L3, a clock signal SCLK from the output port L4, and correction digital data DIN from the output L6 are input to the D/A conversion circuit IC2 having a function which converts the correction digital data into the analogue data. The D/A conversion circuit IC2 has a function performing digital/analogue conversion of digital data for correction as reference positional information showing that the CCD 101 as the image pick up device is in the reference position.

The D/A conversion circuit IC1 constitutes a part of the feedback circuit 50. A common line 63 and two output lines 64, 65 are connected to the D/A conversion circuit IC1. The common line 68 is connected to a power source Vcc via resistances R12, R11, a grounding wire via a resistance R13, and coil drive circuits MD1, MD2. The output line 64 is connected to an input terminal L7 of the coil drive circuit MD1 via a resistance R14. The output line 65 is connected to an input terminal L8 of the coil drive circuit MD2 via a resistance R15.

The connection point between the resistance R14 and the input terminal L7 is connected to a ground terminal ER1 of the coil drive circuit MD1 via a capacitor C3. The connection point between the resistance R15 and the input terminal L8 is connected to a ground terminal ER2 of the coil drive circuit MD2 via a capacitor C4. A control signal CONT1 is input to the coil drive circuits MD1, MD2 from the processor 104. The coil drive circuit MD1 has an output terminal connected to a coil COL1" (serial connection body of coil body COL1 and coil body COL1') via a resistance R16 and connected to a capacitor C5 in parallel with the serial body of the resistance R16 and the coil COL1". The coil drive circuit MD2 has an output terminal connected to a coil COL2" (serial connection body of coil body COL2 and coil body COL2') via a resistance R17 and connected to a capacitor C6 in parallel with the serial body of the resistance R17 and the coil body COL2". The coil COL 1" moves the mounting stage 15 in the pitch direction, and the coil COL2" moves the mounting stage 15 in the yaw direction. Moreover, the coil body COL1 moves one part of the mounting stage 15 in the pitch direction, and the coil body COL1' moves the other part of the mounting stage 15 in the pitch direction. Furthermore, the coil body COL2 moves one part of the mounting stage 15 in the yaw direction, and the coil body COL2' moves the other part of the mounting stage 15 in the yaw direction.

Here, a predetermined voltage or current is applied to each of the hall elements H1, H2, and the detection output voltage levels of the hall elements H1, H2 are configured to be Vh1, Vh2 when the detection outputs of the gyro sensors S1B, S2A are zero and also the CCD 101 exists in the reference position (original position O) of the movable area. In this case, the analogue output voltage levels of the input ports L1, L2 of the processor 104 are configured to be V1ADin, V2ADin, respectively. These output voltage levels V1ADin, V2ADin are actually measured.

The output voltage levels (actual measurement values) V1ADin, V2ADin are varied based on the assembling error factor regarding the mechanical positional relationship between the magnets (permanent magnet) 16*a*-16*d* and the hall elements H1, H2, the assembling error factor between the mounting positions of the hall elements H1, H2 and the mounting positions of the coils COL1", COL2" with respect to the mounting stage 15, or the like. In addition, the output voltage levels vary according to the characteristics of the hall elements H1, H2.

Therefore, if correction is not performed, the detection values of the hall elements H1, H2 corresponding to the reference position or original position O vary for each of cameras; thus, accurate image blur suppression can not be conducted.

Consequently, correction voltages Vr1', Vr2', which are input to the operational amplifiers OP1, OP2 respectively from the digital/analogue converter IC2, are set, such that the output voltage levels V1ADin, V2ADin after correcting become constant voltage levels (setting reference voltage levels). More particularly, the correction voltages Vr1', Vr2' are set so as to correct the variations in the output voltage levels (detection values) V1ADin, V2ADin when the CCD 101 exists in the reference position or original position O and the CCD 101 is not controlled (when the power is not supplied to the coil bodies COL1", COL2").

In this case, in order to set the setting reference voltage level, for example, 1.7 volts which is substantially a central value of movable range voltage of the operational amplifiers OP1, OP2, the processor 104 performs the following calculation.

Here, for the sake of convenience, the resistances are set to $R2=R3=R7=R8$, $R1=R4=R10=R6$, but not limited thereto.

Under the conditions of $R2=R3=R7=R8$, $R1=R4=R10=R6$, the following relational expressions are realized.

$$V1ADin=R1/R2*((Vh1+)-(Vh1-))+Vr1'$$

$$V2ADin=R1/R2*((Vh2+)-(Vh2-))+Vr2'$$

The processor 104 obtains the correction voltage values Vr1', Vr2' by the calculation based on the above relational expressions. As a result, even if the detection values of hall elements H1, H2 in the reference position or original position O of the CCD 101 vary based on the assembling error factor regarding the mechanical positional relationship between the magnets (permanent magnets) 16a-16d and the hall elements H1, H2, the assembling error factor between the mounting positions of the hall elements H1, H2 and the mounting positions of the coils COL1", COL2" with respect to the mounting stage 15, or the like, the CCD 101 can be moved in accordance with the correction amount detected by the gyro sensors.

The processor 104 includes, together with the D/A conversion circuit IC2, a part of variation correction circuit, which outputs correction values for setting the detection values to the setting reference voltage levels regardless of the variations in the detection values of hall elements H1, H2, and also functions calculating a correction value (reference positional information showing that the image pick up device is in the reference position) and storing the correction value in a storing device, for example, the RAM 107.

Figure 23:
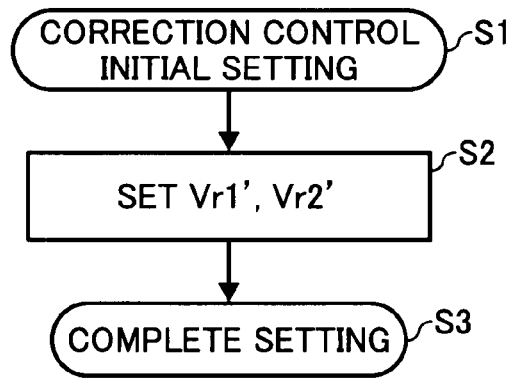
FIG. 23 is a flow chart presenting one example of a variation correction setting process according to the present invention.

This initial setting is set before shipment which is a final inspection in a factory for assembling a camera, as illustrated in the flow chart of FIG. 23 (reference to S1-S3).

More particularly, in the initial setting of correction control (S1), the correction voltage levels Vr1', Vr2' of the hall elements H1, H2 are set for each camera (S2). The setting of correction voltages is therefore completed (S3).

Figure 24:
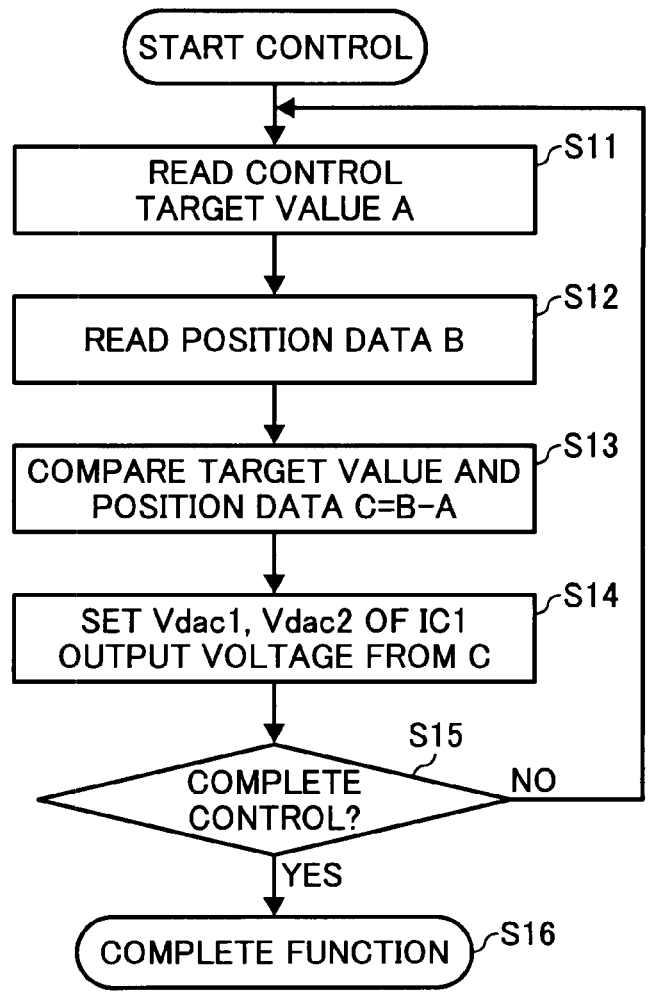
FIG. 24 is a flow chart presenting one example of a process of a control circuit for suppressing an image blur according to the present invention.

As presented in the flow chart of FIG. 24, in the actual control of image blur suppression, the processor 104 loads the control target values A obtained by the calculations based on the detection outputs OUT1, OUT2 of the camera shake detection circuit (S11), and then loads the actual position correspondence voltage levels as detection information (positional data B) V1ADin, V2ADin obtained by the hall elements H1, H2 (S12); thereby, the processor 104 calculates the difference C between the control target values A and the position correspondence voltage values V1ADin, V2ADin (S13).

The processor 104 outputs the control data to the digital/analogue conversion circuit IC1 based on the output of the difference. The digital/analogue conversion circuit IC1 outputs the control voltages Vdac1, Vdac2 corresponding to the control data (S14). The control voltages Vdac1, Vdac2 are input to the coil drive circuits MD1, MD2. The coil drive circuits MD1, MD2 output the driving voltages Vout1, Vout2 to the COL1", COL2", respectively. In other words, the feedback circuit 50 functions as a drive circuit to drive the CCD 101 as the image pick up device based on the detection information output by the position detection device.

Here, the driving voltages Vout1, Vout2 are set according to the following equations.

$$Vout1=(Vdac1-Vr)*K$$

$$Vout2=(Vdac2-Vr)*K$$

Where, Vr is division voltage.

In this case, reference number K is a ratio constant based on the division voltage, Vr.

The CCD 101 is attracted and repelled by the magnetic field of the magnets 16a-16d and the coils COL1", COL2" to move in the direction which is controlled by the driving voltages Vout1, Vout2 of positive voltage or negative voltage. The detected values of hall elements H1, H2 are, thereby, changed. The position correspondence voltage levels V1ADin, V2ADin are changed corresponding to the change in the detected values, and the position correspondence voltage levels are fed back to the processor 104, so the CCD 101 can be smoothly followed to the target position when the target values are changed by the detection values of the camera shake detection circuit (S15). If the photographing is completed, the control is concluded (S16).

MODIFICATION EXAMPLE

Figure 25A:
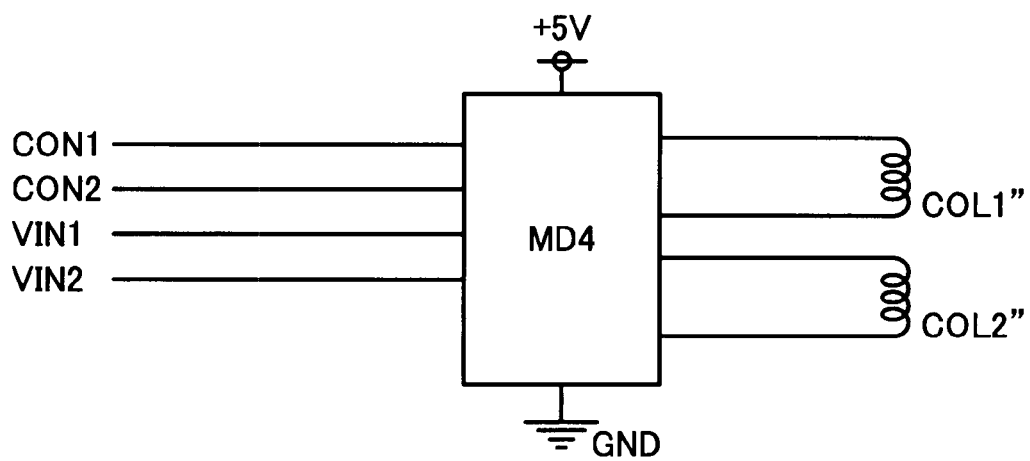
FIG. 25A is a block circuit view of the PWM control and FIG. 25B is a timing chart thereof.

FIG. 25 is a circuit diagram illustrating a modification example of the feedback circuit 50. In this case, the processor 104 controls the driving of coil driver MD4 by means of PWM control (pulse width modulation control), so as to control the power distribution to the coils COL1", COL2" as shown in FIG. 25A.

More particularly, a normal direction rotation signal CON1 and a reverse direction rotation signal CON2 are input to the coil driver MD4, together with a pulse signal. The coil driver MD4 is driven by the voltages Vin1, Vin2 according to the pulse signal. In case of the normal direction rotation, the power distribution voltages to the coils COL1", COL2" increase as the energization time of high level of the pulse signal gets longer. In case of the reverse direction rotation, the power distribution voltages to the COL1", COL2" reduce as the energization time of high level of the pulse signal gets longer.

Figure 25B:
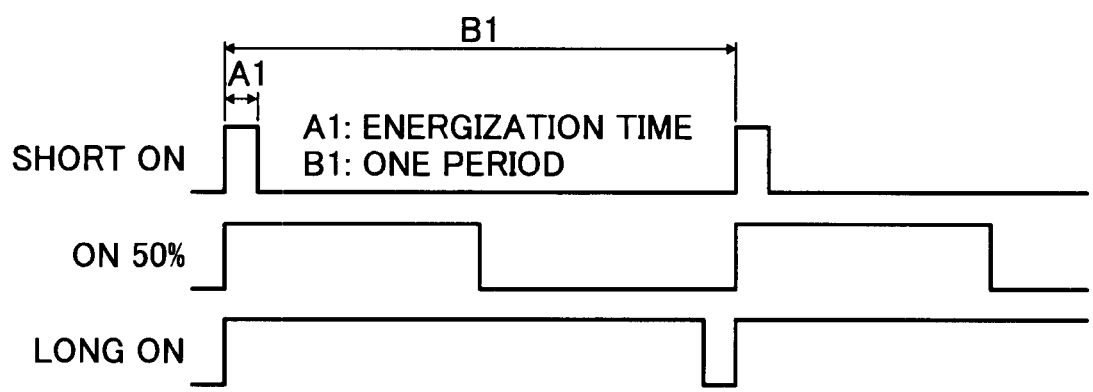

FIG. 25B shows a relationship between the energization time to the coil driver MD4 and the one period and cases that the energization time A1 to the one period B1 is short (short ON), the energization time A1 to the one period B1 is 50% (60% ON) and the energization time A1 to the one period B1 is long (long ON). For example, in case of normal rotation, energization voltages to the coils COL1 and COL2 are high as the energization time of the high level of the pulse signal is long.

In this PWM control, a PWM frequency is determined by setting a pulse width larger than a minimum control unit to be a minimum resolution when a minimum pulse width is set to be the minimum control unit by an electric characteristic of the coil driver MD4. For example, if the minimum pulse width is 100 nsec and accuracy of the PWM control is 1%, because the pulse width varies in a range from 100 μsec to 100×100 μsec, it is required that the period is set to be 10 μsec and the PWM frequency is set to be 100 KHz or less.

(Details of Photographing by Suppression Mechanism)

Figure 26:
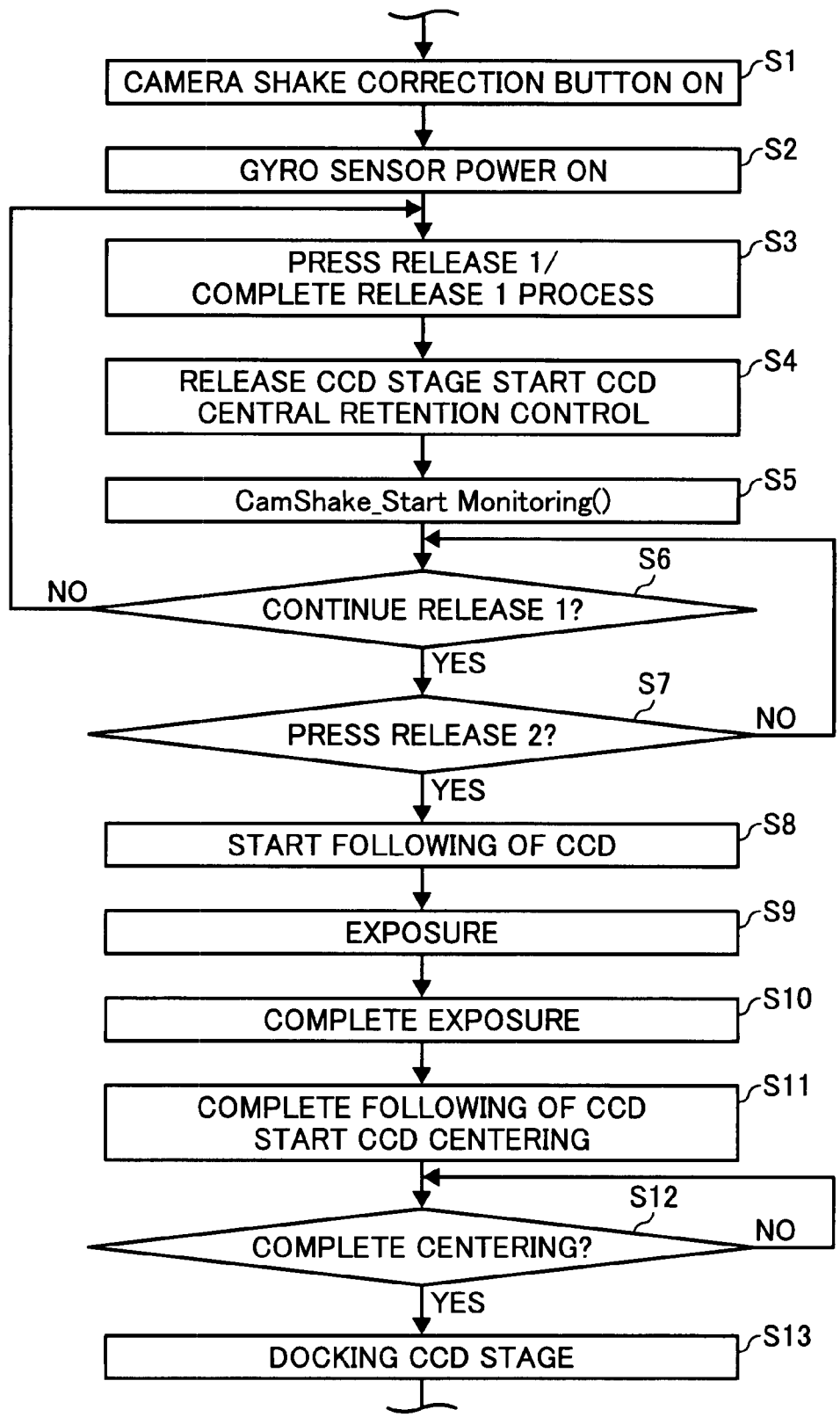
FIG. 26 is a flow chart illustrating a flow of process of an imaging apparatus for suppressing an image blur according to the present invention.

As illustrated in FIG. 26, if the suppression switch SW14 is turned on (S1), the gyro sensors S1B, S2A are powered on (S2). If the release switch SW1 is pressed to complete the half-pressing (S3), the auto focusing operation (focusing operation) is initiated (S.4). At the same time, the mechanical forced fixation of mounting stage 15 is released, and the CCD central retention control is initiated by the power distribution to the coils COL1", COL2" (S4).

Namely, in case of the half-pressing of release switch SW1, in a state that the mounting stage 15, which is forcibly retained in the reference position or original position O in a mechanical manner by fitting the retainer pin 33 of the reference position forced retention mechanism 1263 into the concave portion 19a, is released, the mounting stage 15 is controlled by utilizing the hall elements H1, H2, permanent magnets (magnets) 16a-16d and coils COL1", COL2", such that the mounting stage 15 remains in the reference position or original position O. Thereby, it becomes possible to obtain the maximum movable area of mounting stage 15.

Accordingly, in case of the full-pressing of release switch SW1, the deterioration in the image resulted from the camera shake can be securely solved.

Next, the monitoring process by camera shake is initiated (S5). The processor 104 determines whether or not the half-pressing of release switch SW1 is continued (S6). If the half-pressing of release switch SW1 is continued, the processor 104 determines whether or not the full-pressing of release switch SW 1 is performed (S7). If the half-pressing of release switch SW1 is released, the flow goes back to step S3, and if the full-pressing of release switch SW1 is not performed, the flow goes back to step S6.

If the full-pressing of release switch SW1 is completed, the following of the CCD 101 is started in the moving direction of image (S8). Next, the exposure is performed (S9). If the exposure is completed (S10), the following of the CCD 101 is stopped (S11), the mounting stage 15 is returned to the reference position or original position O by the power distribution control to the coils COL1", COL2" (S11), it is determined whether or not the mounting stage 15 is returned to the reference position or original position O (S12), and the CCD is forcibly fastened to the reference position or original position O in a mechanical manner (S13).

There are two modes for the operation timing of release switch SW1.

Figure 27:
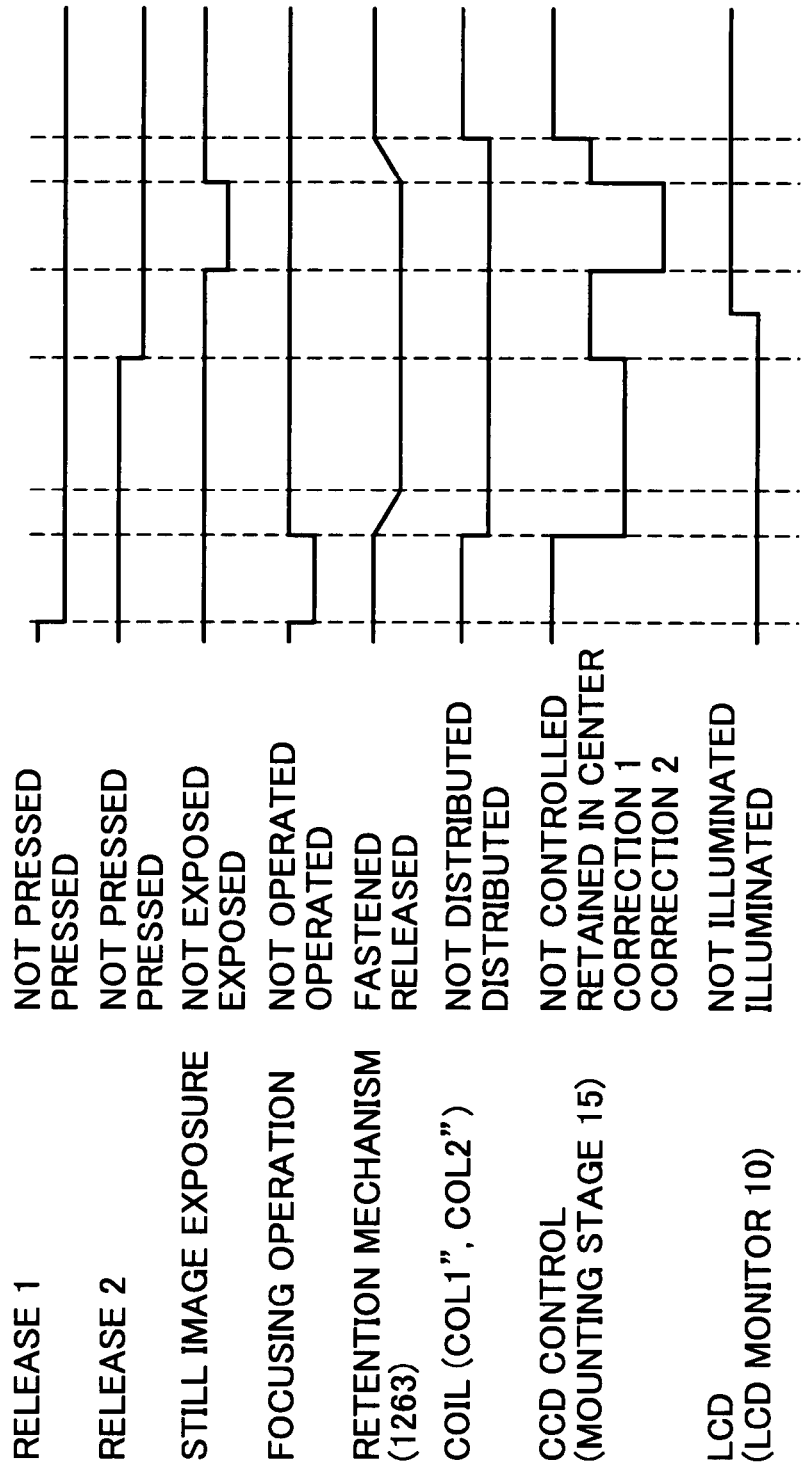
FIG. 27 is a timing chart illustrating one example of the suppression process in case of the full-pressing of the imaging apparatus according to the present invention.

FIG. 27 is the timing chart of process for suppressing an image blur in case of the full-pressing of release switch SW1. In this case, the full-pressing means release operation having discontinuity from the half-pressing operation of release switch SW 1 to the full-pressing operation of release switch SW1, for example, photographing operation which moves to exposure start operation at the right moment after the half-pressing operation.

If the release switch SW1 is half-pressed, the focusing operation of digital camera is started. In this state, the reference position forced retention mechanism 1263 has not released the forced retention of the mounting stage 15 yet. The power is not supplied to the coils COL1", COL2". In addition, the mounting stage 15 is mechanically fixed to the central position, and the subject image is displayed onto the LCD monitor 10.

If the focusing operation is completed, the processor 104 starts the power distribution to the stepping motor STM1 of the reference position forced retention mechanism 1263. The mechanical forced retention of the mounting stage 15 is, thereby, released. At the same time, the energization or power distribution to the coils COL1", COL2" is started, and the suppression process (correction 1) during the half-pressing operation of release switch SW1 (release 1) is conducted by the control of power distribution to the coils COL1", COL2". If the release switch SW1 is fully pressed (release 2), the mounting stage 15 is once returned to the central position by the control of power distribution to the coils COL1", COL2", and then the LCD monitor 10 is turned off after some time so as not to display the subject image.

Next, if the still image exposure is started, the mounting stage 15 is controlled to follow the movement of image based on the camera shake (correction 2). If the still image exposure is completed, the mounting stage 15 is returned to the central position based on the control of power distribution to the coils COL1", COL2". Next, the processor 104 starts the power distribution to the stepping motor STM1 of the reference position forced retention mechanism 1263. The mechanical forced fixation of mounting stage 15 is, thereby, performed, and then the power distribution to the coils COL1", COL2" is stopped.

As described above, even if the camera is shaken, a user can recognize the LCD monitor 10 to monitor the subject image without having the camera shake during the release 1.

In addition, if the mounting stage 15 is returned to the central position during the release 2, the composition during the release 2 is displaced with respect to the composition of subject image during the release 1. However, according to the present embodiment, it is possible to confirm the subject image right before photographing in a state that the mounting stage 15 is once returned to the central position, so it is possible to confirm the composition of subject image right before photographing (right before exposing).

Figure 28:
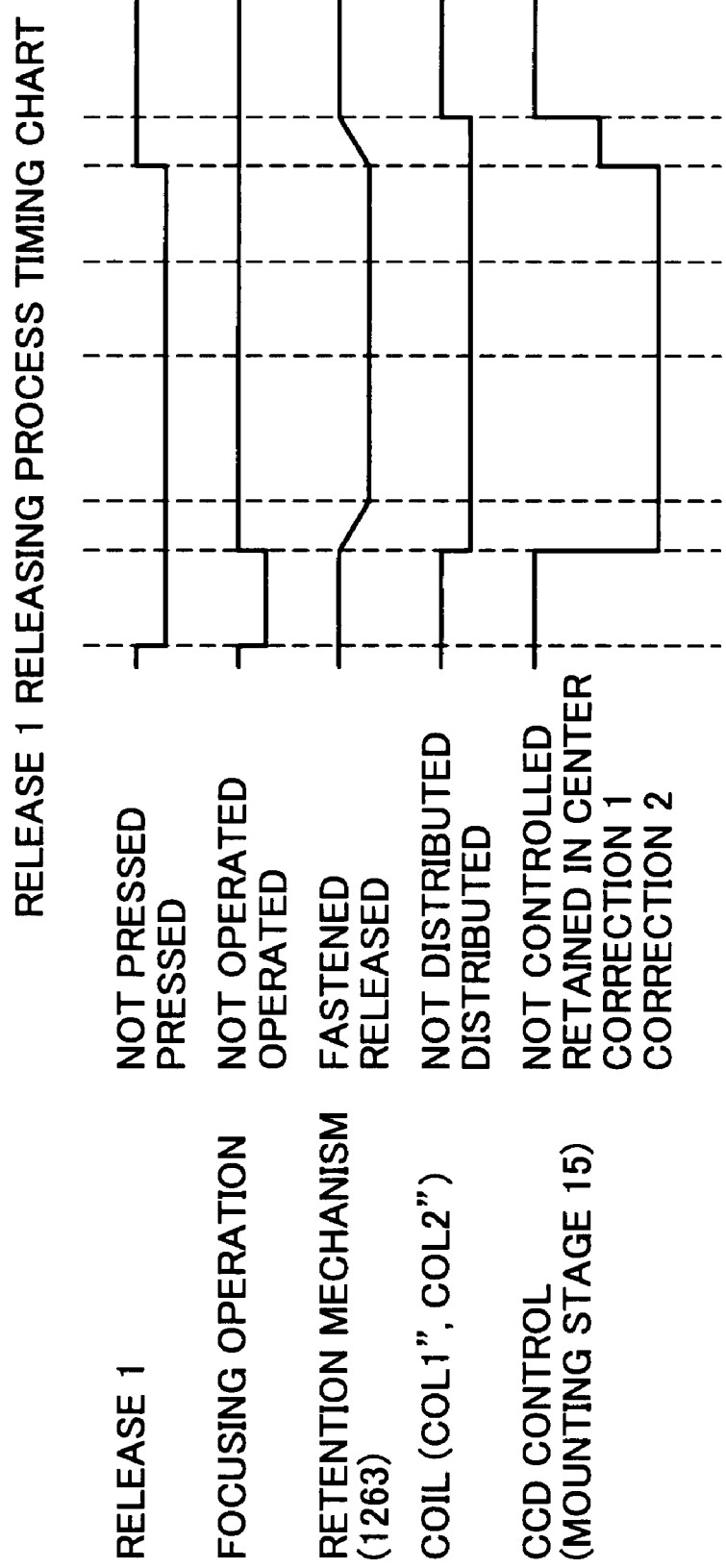
FIG. 28 is a timing chart presenting one example of the release process of suppression process of the imaging apparatus according to the present invention.

If the release switch SW1 is half-pressed, and the half-pressing of release switch SW1 is released without fully pressing the release switch SW1, as presented in FIG. 28, the focusing operation is started at the same time as the half-pressing. If the focusing is completed, the processor 104 starts the power distribution to the stepping motor STM1 of the reference position forced retention mechanism 1263; thereby, the mechanical forced retention of mounting stage 15 is released. At the same time, the power distribution to the coils COL1", COL2" is started, and the suppression process during the half-pressing operation of release switch SW1 (release 1) is performed by the control of power distribution to the coils COL1", COL2".

If the half-pressing operation of release switch SW1 is released during the half-pressing operation of release switch SW1, the mounting stage 15 is retuned to the central position based on the control of power distribution to the coils COL1", COL2". Next, the processor 104 starts the power distribution to the stepping motor STM1 of the reference position forced retention mechanism 1263; thereby, the mechanical fixation and retention of the mounting stage 15 is conducted. Next, the power distribution to the coils COL1", COL2" are stopped.

FIG. 29 is a timing chart illustrating the suppression process when the release switch SW 1 is fully pressed at one shot. In this case, the full-pressing at one shot means release operation having continuousness from the half-pressing operation (release 1) of release switch SW1 to the full-pressing operation (release 2) of release switch SW1, for example, photographing operation which immediately moves to exposure start operation after the half-pressing.

If the release switch SW1 is half-pressed, the focusing operation of digital camera is started. The subject image is displayed on the LCD monitor 10. In addition, the full-pressing operation of release switch SW1 is immediately performed right after the half-pressing of the release switch SW1. At the same time, the LCD monitor 10 is turned off so as not to display the subject image.

If the focusing operation is completed, the processor 104 starts the power distribution to the stepping motor STM1 of the reference position forced retention mechanism 1263; thereby, the mechanical retention of the mounting stage 15 is released. At the same time, the power distribution to the coils COL1", COL2" are started, and the mounting stage 15 is retained in the central position by the power distribution control to the coils COL1", COL2". Therefore, the suppression process is performed.

If the mounting stage 15 is maintained in the central position by the power distribution to the coils COL1", COL2", and the still image exposure is started, the mounting stage 15 is controlled to follow the movement of image based on the camera shake. If the still image exposure is completed, the mounting stage 16 is returned to the central position based on the power distribution control to the coils COL1", COL2". Next, the processor 104 starts the power distribution to the stepping motor STM1 of the original position forced retention mechanism 1263; thereby, the mechanical fixation and retention of the mounting stage 15 is performed. Next, the power distribution to the coils COL1", COL2" is stopped.

In case of the above described full-pressing at one shot, it is considered that the confirmation of the composition is completed during the operation of release 1, so it is not necessary to confirm the composition during the release 2. Accordingly, it is considered that the reconfirmation of the composition is not necessary even if the mounting stage 15 is once returned to the central position during the release 2, so that the suppression control process can be simplified.

Moreover, since the LCD monitor 10 is turned off during the focusing operation, the battery drain can be avoided.

Furthermore, since the absorption bar 35 can be absorbed to the magnets 16b, 16d to be retained when the mounting stage 15 is forcibly pressed to the position of original position in a mechanical manner, the chattering of the mounting stage 15 in the Z-axis direction is controlled.

In the above-mentioned embodiments, although the photographing optical axis is set to correspond to the Z-axial direction, the position of the CCD is detected by the position detection element by setting the intersection of the X-Y plane perpendicular to the photographing optical axis and the Z-axis to be the reference position, the reference position is not limited to the intersection. In addition, the position of the image pick up device movable in the perpendicular direction to the photographing optical axis is detected by the position detection device to prevent the image blur, but the lens system may be moved relative to the image pick up device by fixing the image pick up device to the photographing optical axis.

Although the present invention has been described in terms of exemplary embodiments, it is not limited thereto. It should be appreciated that variations may be made in the embodiments described by persons skilled in the art without departing from the scope of the present invention as defined by the following claims. The limitations in the claims are to be interpreted broadly based the language employed in the claims and not limited to examples described in the present specification or during the prosecution of the application, which examples are to be construed as non-exclusive.

What is claimed is:

1. An imaging apparatus, comprising:
a control circuit to suppress image blur which calculates a movement amount of an image imaged on an image pick up device as target information by detecting camera shake with a camera shake detection circuit, moves the image pick-up device in a transverse direction to a photographing optical axis based on the calculated target information, detects an actual position of the image pick-up device by a position detection device, sets displacement information according to a displacement from a reference position of the image pick-up device based on detection information detected by the position detection device, and moves the image pick-up device to follow the image moved by the camera shake based on a difference between the displacement information and the target information, the control circuit including:
a feedback circuit which controls the image pick-up device in a direction where the difference between the displacement information and the target information reduces;
a setting circuit which sets the displacement information; and
a storing device configured to store reference positional information showing that the image pick up device is in the reference position,
wherein the setting circuit is configured to store reference positional information showing that the image pick up device exists in the reference position and the image pick-up device is in the reference position based on positional detection information when the position of the image pick up device is not controlled, in the storing device.

2. The imaging apparatus according to claim 1,
wherein the position detection device is formed by a hall element,
wherein the image pick up device is mounted on a mounting stage which is movable in a transverse direction to the photographing optical axis by energization of a coil, and
wherein the feedback circuit is configured to apply a current which reduces the difference between the displacement information and the target information to the coil.

3. The imaging apparatus according to claim 2,
wherein the coil is disposed to face a permanent magnet,
wherein the hall element generates a voltage in each of transverse directions to both of a direction of superimposed voltage and a direction of magnetic field transverse to the direction of superimposed voltage so that the displacement information is set based on the voltage of the hall element.

4. The imaging apparatus according to claim 2,
wherein the reference positional information is a correction value,
wherein the displacement information is a position correspondence voltage value as a voltage value according to the displacement from the reference position.

5. The imaging apparatus according to claim 4,
wherein the setting circuit includes an operational amplifier having an input terminal in which a detection value of the hall element the correction value are input and an output terminal to output the position correspondence voltage value.

6. The imaging apparatus according to claim 5,
wherein the control circuit to suppress the image blur is configured to obtain the correction value by calculating an operation correspondence voltage value prior to correction output from the operational amplifier when the image pick up device is in the reference position and energization is not performed to the coil.

7. The imaging apparatus according to claim 6,
wherein the setting circuit is configured to set a setting reference voltage value corresponding to the reference operational information output from the operational amplifier based on the correction value to become a central position of an operation range of the operational amplifier.

8. The imaging apparatus according to claim 2,
wherein the control circuit to suppress the image blur includes a sensor which detects a yaw-direction and a pitch-direction, and
wherein the mounting stage is moved in a plane transverse to the photographing optical axis based on detection output in the yaw-direction and the pitch-direction of the sensor.

9. The imaging apparatus according to claim 8,
wherein the feedback circuit includes an X-direction driver configured to control energization to an X-direction driving coil to move the mounting stage in an X-direction transverse to the photographing optical axis and a Y-direction driver configured to control energization to a Y-direction driving coil to move the mounting stage in a Y-direction transverse to the photographing optical axis and the X-direction.

10. The imaging apparatus according to claim 9,
wherein the X-direction driver and the Y-direction driver are controlled by pulse width modulation.

11. The imaging apparatus according to claim 8,
wherein the camera shake correction detection circuit includes a gyro sensor, a high-pass filter and an operational amplifier.

* * * * *